United States Patent
Crawley

(10) Patent No.: US 9,557,740 B2
(45) Date of Patent: Jan. 31, 2017

(54) AUTONOMOUS MOBILE PLATFORM FOR SERVICE APPLICATIONS

(71) Applicant: David Crawley, Santa Clara, CA (US)

(72) Inventor: David Crawley, Santa Clara, CA (US)

(\*) Notice: Subject to any disclaimer, the term of this patent is extended or adjusted under 35 U.S.C. 154(b) by 240 days.

(21) Appl. No.: 13/999,863

(22) Filed: Mar. 28, 2014

(65) Prior Publication Data

US 2015/0012163 A1  Jan. 8, 2015

Related U.S. Application Data

(60) Provisional application No. 61/957,425, filed on Jul. 2, 2013.

(51) Int. Cl.
  *B25J 5/00* (2006.01)
  *G05D 1/02* (2006.01)
  *B25J 11/00* (2006.01)
  *G01S 17/93* (2006.01)

(52) U.S. Cl.
  CPC ............ *G05D 1/0248* (2013.01); *B25J 11/008* (2013.01); *G01S 17/936* (2013.01); *G05D 2201/0211* (2013.01)

(58) Field of Classification Search
  USPC .............................. 318/568.11, 568.12, 568.2
  See application file for complete search history.

(56) References Cited

U.S. PATENT DOCUMENTS

| | | | |
|---|---|---|---|
| 323,213 A | 7/1885 | Sandeman | |
| 371,257 A | 10/1887 | Everitt | |
| 382,734 A | 5/1888 | Nuss | |
| 402,515 A | 4/1889 | Everitt | |
| 412,469 A | 10/1889 | Cochran | |
| 2,299,583 A | 10/1942 | Loewy | |
| 2,852,159 A | 9/1958 | Klein | |
| 4,844,493 A | 7/1989 | Kramer | |
| 6,484,068 B1 | 11/2002 | Yamamoto et al. | |
| 6,540,100 B2 * | 4/2003 | Credle, Jr. | B62B 5/0026 221/119 |

(Continued)

OTHER PUBLICATIONS

"Robot selling gets its first big test", Business Week, May 27, 1950, pp. 70-71,73.

(Continued)

*Primary Examiner* — Jorge L Carrasquillo
(74) *Attorney, Agent, or Firm* — Franklin Schellenberg

(57) ABSTRACT

The invention disclosed with this Application is a autonomous mobile system comprising: a means of achieving mobility, a means of navigating, a means of providing autonomous power, and a means of providing general purpose computing.

In some embodiments, the system comprises a base unit capable of sensing its environment and computing navigation instructions to direct the system to move to particular locations and execute particular functions, as directed by a set of programmed instructions.

In some embodiments, a coupling exists on the base unit to attach additional structures and mechanisms. These structures may comprise a means for carrying packages or other items, robotic manipulators that can grab and move objects, interactive audio and video displays for telepresence applications, a means for serving food and drink, etc. These extensions may be designed to be detachable and interchangeable, or may be designed to be permanently attached to the base unit.

29 Claims, 23 Drawing Sheets

(56) References Cited

U.S. PATENT DOCUMENTS

| | | | |
|---|---|---|---|
| 6,742,673 | B2 | 6/2004 | Credle, Jr. |
| 6,904,335 | B2 | 6/2005 | Solomon |
| 7,343,222 | B2 | 3/2008 | Solomon |
| 7,348,747 | B1* | 3/2008 | Theobold ................ B25J 5/005 318/568.11 |
| 7,398,843 | B2 | 7/2008 | Buehler et al. |
| 7,539,557 | B2 | 5/2009 | Yamauchi |
| 7,555,363 | B2 | 6/2009 | Augenbraun et al. |
| 7,620,476 | B2 | 11/2009 | Morse |
| 7,706,917 | B1 | 4/2010 | Chiappetta |
| 8,010,231 | B2 | 8/2011 | Sumida et al. |
| 8,077,963 | B2 | 12/2011 | Wang et al. |
| 8,112,176 | B2 | 2/2012 | Solomon |
| 8,126,592 | B2 | 2/2012 | Saunders |
| 8,306,664 | B1 | 11/2012 | Wiley et al. |
| 8,327,960 | B2 | 12/2012 | Couture et al. |
| 8,380,350 | B2 | 2/2013 | Ozick et al. |
| 8,401,275 | B2 | 3/2013 | Wang et al. |
| 8,442,661 | B1 | 5/2013 | Blackwell et al. |
| 8,483,881 | B2 | 7/2013 | Ermakov et al. |
| 8,577,538 | B2 | 11/2013 | Lenser |
| 8,594,840 | B1 | 11/2013 | Chiappetta |
| 8,606,401 | B2 | 12/2013 | Ozick et al. |
| 8,634,956 | B1 | 1/2014 | Chiappetta |
| 8,634,958 | B1 | 1/2014 | Chiappetta |
| 2003/0160059 | A1* | 8/2003 | Credle, Jr. ............ B62B 5/0026 221/123 |
| 2006/0190146 | A1 | 8/2006 | Morse et al. |
| 2007/0156286 | A1* | 7/2007 | Yamauchi ............ G05D 1/0038 700/245 |
| 2007/0192910 | A1* | 8/2007 | Vu ........................ B25J 5/007 700/245 |
| 2009/0149991 | A1* | 6/2009 | Sumida ................ G06N 3/008 700/246 |
| 2010/0073490 | A1* | 3/2010 | Wang ...................... B25J 5/007 348/207.11 |
| 2010/0263948 | A1* | 10/2010 | Couture ................ B25J 5/005 180/8.2 |
| 2014/0009561 | A1* | 1/2014 | Sutherland ............ B25J 5/007 348/14.05 |

OTHER PUBLICATIONS

Martin V. Marshall, Automatic Merchandising; a study of the problems and limitations of vending, (Harvard University, Cambridge, MA, 1954), pp. 6-11.
Kerry Segrave, Vending Machines: An American Social History (Mcfarland & Co, Jefferson, NC, 2002) Ch. 1 (pp. 5-20); Ch. 2 (pp. 21-32).
Kurt Konolige et al., "A Low-Cost Laser Distance Sensor", 2008 IEEE International Conference on Robotics and Automation Pasadena, CA, USA, May 19-23, 2008, pp. 3002-3008.
Hokuyo UTM-30LX Scanning Range Finder Website data page: <https://www.hokuyo-aut.jp/02sensor/07scanner/utm_301x. html >, Hokuyo Automatic Co. Ltd. , Osaka, Japan First known upload Feb. 3, 2009; verified May 15, 2016.
Rockchip RK3188 Datasheet, Revision 1.0, Fuzhou Rockchip Electronics Co., Ltd., Fuzhou, Fujian, China, Feb. 22, 2013.
Intel® Core™ i7-900 Desktop Processor Extreme Edition Series and Intel® Core™ i7-900 Desktop Processor Series Datasheet, vol. 1, Document No. 322910-003, Intel Corp. Santa Clara, CA, Feb. 2010.
Intel® Core™ i5-600, i3-500 Desktop Processor Series and Intel® Pentium® Desktop Processor 6000 Series Datasheet—vol. 2, Document No. 322910-003, Jan. 2011 Intel Corp. Santa Clara, CA, Jan. 2011.
AMD Family 10h Desktop Processor Power and Thermal Data Sheet Publication # 43375 Revision: 3.46 Advanced Micro Devices Corp. Sunnyvale, CA Issue Date: Sep. 2010.
Technical Manual of AMD 780G Based Mini-ITX M/B for Socket AM2+ AMD Quad Core Processor No. G03-NC81-F Revision: 2.0 Advanced Micro Devices Corp. Sunnyvale, CA Release date: Oct. 2009.
ARM Architecture Reference Manual, Issue I ARM Ltd., Cambridge, England, UK, Jul. 2005.
NVIDIA Tegra K1 Mobile Processor Technical reference Manual, DP-06905-001_v03p NVIDIA Corp., Santa Clara, CA, Oct. 15, 2014.
NVIDIA Tegra 2 Family Technical reference Manual, DP-04508-001_v02p NVIDIA Corp., Santa Clara, CA , May 25, 2012.
NVIDIA Tegra 3 HD Mobile Processors Technical reference Manual, DP-05644-001_v03p NVIDIA Corp., Santa Clara, CA, Sep. 12, 2013.
NVIDIA Tegra 4 Family CPU Architecture 4-Plus-1 Quad core NVIDIA Corp., Santa Clara, CA , 2013.
Qualcomm Snapdragon 800 Processors, Summary Datasheet Qualcomm Technologies, Inc. San Diego, CA, 2013.
Qualcomm Snapdragon 805 Processor, Summary Datasheet Qualcomm Technologies, Inc. San Diego, CA, 2014.
Samsung Exynos Application Processors Summary Datasheet Samsung Electronics Ltd., Suwon-Shi, South Korea (no date).
Manbok Kim et al., Samsung Exynos 5410 Processor White Paper Samsung Electronics Co. Ltd., Suwon-Shi, South Korea, 2013.
OMAP-L138 DSP+ARM Processor Technical Reference Manual, Literature No. SPRUH77A Texas instruments, Dallas, TX, Dec. 2011.
Rockchip RK3288 Datasheet, Revision 1.0. Fuzhou Rockchip Electronics Co., Ltd., Fuzhou, Fujian, China, May 2014.
A10 Datasheet V 1.21 Allwinner Technology Co., Ltd., Zhuhai, China, Apr. 6, 2012.
A20 User Manual Revision 1.0, Allwinner Technology Co., Ltd., Zhuhai, China, Feb. 18, 2013.
RB-Rax-05 Radxa Rock Lite ARM Cortex Microcontroller Specification Sheet Radxa Ltd., Shenzen, China (no date).
RB-Rax-10 Radxa Rock Pro ARM Cortex Microcontroller Specification Sheet Radxa Ltd., Shenzen, China (no date).
An introduction to cubieboard Slide presentation available at: <lib.chipdip.ru/974/DOC000974437.pdf > Cubietech Ltd., Zhuhai, Guangdong, China, 2013.
NVIDIA Jetson TK1 Development Kit: Bringing GPU-accelerated computing to Embedded Systems Technical Brief, Release 1.0. NVIDIA Corp., Santa Clara, CA , 2014.
S805 Datasheet Revision: 0.8 Amlogic Inc., Santa Clara, CA Jan. 26, 2015.
ODROID User Manual (Developer edition) Version 0.9. Hardkemel Co., Ltd, GyeongGi, South Korea (no date).
ODROID C-1 User Manual (Developer edition) Version 0.9 Hardkemel Co., Ltd, GyeongGi, South Korea, 2015.
OMAP4460 Pandaboard ES System Reference Manual Revision 0.1 DOC-21054 Pandaboard.org, Sep. 29, 2011.
Raspberry Pi, model B+, Raspberry Pi 2, Model B, & Raspberry Pi 3 Model B Datasheets Raspberry Pi Foundation, Caldecote, England, UK (no dates).
Intel® Desktop Board DP965LT Technical Product Specification Order No. D56017-002US Intel Corp. Santa Clara, CA Sep. 2006.
Intel® Desktop Boards D915GAV/D915GAG, Technical Product Specification Order No. C68600-002, Intel Corp. Santa Clara, CA Dec. 2004.
Intel® Desktop Board D865GBF/D865GLC, Product Guide, Revision-002 Order No. C24485-002 Intel Corp. Santa Clara, CA May 2003.
Bob Ogrey, Eugene Chung, & Otto Joe, OPEN Compute Project, AMD Motherboard Hardware v3.0 Advanced Micro Devices, Inc. Sunnyvale, CA, Apr. 15, 2012.
Daniel Maximilian Swoboda, A Comprehensive Characterization of the Asus Xtion Pro Depth Sensor Höhere Technische Bundes Lehr- und Versuchsanstalt, Neustadt Vienna, Austria 2014.
XBOX 360 Kinect Datasheet Microsoft Corp, Redmond, WA, 2010.
OV5647 5-megapixel product brief, Version 1.0 OmniVision Technologies, Inc., Santa Clara, CA, Jan. 2010.
AR130 Datasheet. Aptina Imaging, San Jose, CA, 2012.
Logitech® Webcam C170 datasheet Logitech, Newark, CA, 2011.
Ultrasonic Ranging Module HC—SR04 Elecfreaks, Shenzen, China (no date).

(56) References Cited

OTHER PUBLICATIONS

ZX SparkFun Sensor Datasheet XYZ Interactive Technologies, Toronto, Ontario, Canada, 2014.
Sharp GP2Y0A21YK Optoelectronic Device, datasheet Reference Code SMA05008 Sharp Corp., Osaka, Japan, 2005.
"Introducing Anybots QB,Telepresence Robot" Innovation Matirx, Japan, 2009.
Beam Smart Presence™ System Requirements brochure Suitable technologies, Inc. Palo Alto, CA (no date).
Marc Raibert, Kevin Blankespoor, Gabriel Nelson, Rob Playter, and the BigDog Team, "BigDog, the Rough-Terrain Quaduped Robot" available at <www.bostondynamics.com/img/BigDog_IFAC_Apr-8-2008.pdf> Boston Dynamics, Apr. 8, 2008.
PR2 User Manual Willow Garage, Palo Alto, CA, Oct. 5, 2012.
Robot® Roomba® Owner's Manual Robot Corp. Bedford, MA, 2006.
"7 Things about Double Robotics" Grand Valley State University Technology Showcase flyer (2013).

\* cited by examiner

AUTONOMOUS MOBILE PLATFORM FOR SERVICE APPLICATIONS

CROSS-REFERENCE TO RELATED APPLICATIONS

This patent application claims the benefit of U.S. Provisional Patent Application No. 61/957,425 entitled Extensible Robot System, filed Jul. 2, 2013, which is incorporated herein by reference in its entirety.

FIELD OF THE INVENTION

This invention relates to an autonomous mobile platform that can be flexibly extended to serve in a number of service applications, such as beverage vending, package delivery, or telepresence, through the addition of physical accessories or software.

BACKGROUND OF THE INVENTION

Machines that can automatically serve human beings have been the subject of invention since the first machines were conceived millennia ago. The world's first automatic serving machine was designed by Heron of Alexandria in 63 CE. This consisted of a device for automatically dispensing holy water upon the receipt of a coin. A person put a 5 Drachma coin in a slot at the top of a box, and the coin hits a metal lever attached by a string to a plug that stops a container of liquid. The beam is configured as a balance beam, and so as the beam tilts from the weight of the coin, the string lifts the plug and dispenses the desired drink until the coin drops off the beam. [For a description of this invention, see Kerry Segrave, *Vending Machines: An American Social History* (Mcfarland & Co, Jefferson, N.C., 2002)]. This invention was a simple mechanical device, driven by gravity, and limited to doing one type of thing, in one location, with no ability to process information or make independent decisions.

Book serving machines were devised in England in 1822 by Richard Carlile in an attempt to avoid press censorship— the book was selected by the user and dispensed automatically, so banned books could be purchased with the seller nowhere nearby, allowing the seller to avoid technical charges of sedition [For a description of this invention, see Martin V. Marshall, *Automatic Merchandising; a study of the problems and limitations of vending*, (Harvard University, Cambridge, Mass., 1954)] For the first time a vending machine had an element of interactivity, with the purchaser selecting the book to be purchased and then depositing money. It is not clear whether these systems were autonomous. They certainly were not programmable, mobile, or of generalized functionality.

A fully automatic selling machine was described in a patent application of Simeon Denham of Wakefield in Yorkshire, England, in 1857. [Simeon Denham, A SELF ACTING MACHINE FOR THE DELIVERY OF POSTAGE AND RECEIPT STAMPS, GB Provisional Patent No. 706/1857, 11 Mar. 1857]. This machine was designed to sell a stamp for a penny from a strip of postage stamps contained within it. Denham was given a provisional patent protection, however it does not appear that this crude device, was ever realized in a working form. Again, this device lacked any form of programmability, mobility or autonomous decision-making.

The first fully patented automatic serving device widely recognized to be commercially successful went to John G Sandeman & Percival Everitt [John G. Sandeman & P. Everitt, GB Patent 2033/1883, issued 21 Apr. 1883; and APPARATUS FOR AUTOMATICALLY DELIVERING PREPAID GOODS TO ACCORD WITH THE PRICE PAID THEREFOR, U.S. Pat. No. 323,213, Issued 28, Jul. 1885]. Devices to vend other products soon followed through the 1880s, including some of the first US patents on the topic. Percival Everitt filed a patent for a perfume dispensing machine [P. Everitt, AN APPARATUS FOR THE DELIVERY OF A GIVEN QUANTITY OF LIQUID IN EXCHANGE FOR A COIN, U.S. Pat. No. 371,257, issued 11 Oct. 1887], as well as improvements thereof [P. Everitt, VENDING MACHINE, U.S. Pat. No. 402,515, issued 30 Apr. 1889].

Other commercially successful early vending machines include a device for dispensing packaged goods, including cigarettes and chewing gum [Frederic B. Cochran, COIN-OPERATED VENDING-MACHINE, U.S. Pat. No. 412,469 issued 8 Oct. 1889]. These devices represented the first commercially successful attempts at what came to be known as "robotic" sales. However they operated with manual power provided by the purchaser. They never had the ability to move independently, were not programmable and could only respond to the direct interaction of a user. They had no real anticipatory intelligence.

The first service machine to come with its own source of power was invented by Norman Willis Russ in 1888 [N. W. Russ, COIN OPERATED ELECTRICAL APPARATUS, U.S. Pat. No. 382,734, issued 15 May, 1888]. This was a coin-operated apparatus for delivering electric shocks to people. The power source was an electric pile (an early form of battery). It is important to note that the electricity that was the product of the machine still relied on the manual action of people. While intriguing in that it represented the first time an autonomous service machine with its own power-source appears, the machine wasn't programmable, couldn't move independently and only had very limited user iteration. In this case the coin was deposited and a shock would be dispensed. Perhaps in the days before widespread availability of electricity the delivery of electric shocks was a novelty or seen as medically beneficial, however the present day utility of such a device is unclear. Nonetheless, this device did not use autonomous power to operate the device; the mechanism was still driven by the fall of a mechanical coin. This device clearly had no programmability, no ability to move and no anticipatory intelligence.

With the advent of electrically powered vending machines in the 1940s and 1950s the concept of "robot" selling arose, [see, for example, "Robot selling gets its first big test", *Business Week*, May 27, 1950, pp. 70-71,73]. The Machines anticipated in this prior art however are electrically powered vending machines. They are largely fixed to the ground, and while they can dispense a dizzying array of products as well as, in some cases, heat those products. With the exception of interpreting a selection indicated by the press of a button, they cannot make independent decisions they are not programmable, nor are they mobile.

In 1942 Raymond Loewy and Harry A. Drew patented a vending machine with wheels [Raymond Loewy and Harry A. Drew, VENDING MACHINE, U.S. Pat. No. 2,299,583 issued 20 Oct. 1942]. The intent was to devise a system that could be wheeled out to car drivers. This represents the first time that a vending machine was not fixed to one location. However this vending machine did not move under its own power; it required a human operator to move it. Further the human operator needed to make decisions about where the machine would go and how it would operate. While this machine did have its own source of power in the form of a battery, this was not used to operate the machine; it merely provided a light to indicate to the operator when the machine would need to be restocked. There was no programmability, and it required physical modifications to vend different types of product.

In 1958 Regina Klein Patented an automatic dispenser for trucks. [Regina Klein, ADVERTISING LITERATURE AND ARTICLES DISPENSER FOR TRUCKS, U.S. Pat. No. 2,852,159 issued 16 Sep. 1958]. This was a simple mechanism that enabled trucks to throw newspapers towards the front doors of peoples housed. This concept included the notion of a punched tape to determine the location the paper should be thrown. However this machine was not truly programmable in the current sense of the word. The punched tape merely ran and determined the time when a paper would be thrown. It wouldn't actually run a computer program in the sense of loading on a general purpose computing system. The paper tape mechanism existed to enable the machine to operate different routes.

In 1987 Dale Kramer filed a patent for a remotely controlled vehicle [Dale C. Kramer, REMOTELY-CONTROLLED VEHICLE, U.S. Pat. No. 4,844,493, issued 4 Jul. 1989]. This was a remotely controlled golf cart that was intended to follow its owner around a golf course. This system had its own source of power in the form of a battery. However again this was a specific purpose device—carrying only golf clubs and intended for use in a golf course. The device did not have general programmability, and while it was mobile, and had its own source of power.

In 2001 William Credle, Jr. et al. of the Coca Cola Company filed a patent application that issued as two patents [William S. Credle, Jr., John P. Giles, & James Michael Watson, METHOD AND APPARATUS FOR REMOTE SALES OF VENDED PRODUCTS, U.S. Pat. No. 6,540,100, issued 1 Apr. 2003; and its Divisional U.S. Pat. No. 6,742,673, issued 1 Jun. 2004]. In these patents a system to bring vended products to the consumers along a predetermined route is described. However this invention intends for the cart to move along a predetermined route or with remote control, and so it does not truly navigate in its environment. It requires a human operator to tell it where to go.

Overall, the prior art covers a wide range of applications where machines interact with and do things that are useful for humans or non-humans. There are some systems that have elements of mobility; however almost none truly can understand the nature of their environment and therefore they cannot navigate in it. The overwhelming majority of these devices gather power externally (e.g. from a plug in wall socket or frequently from the operator themselves), and although there are some that have their own internal source of power, this power is typically application specific, designed to operate the specific functions that the machine was devised for rather than being of general nature for whatever the machine might be tasked with. Lastly the provision of general purpose computing capabilities to enable the machine to make general decisions is not present. No prior art examples are known to the inventors that comprise a robot or other automated service machine simultaneously endowed with mobility, navigation, power and computing capabilities, and in which these capabilities are available in a general-purpose manner that can be re-tasked to a variety of applications. And there are certainly no prior art examples known to the inventors of such a robot that is additionally provided with a coupling that enables one to attach external items that extend the functionality of the robot to engage in a variety of tasks.

Because of this, such systems are constrained to a narrow set of operations, such as food and beverage serving, and cannot be applied to a wide variety of applications. Therefore it would be desirable to have a machine unit that can be mass produced, reducing costs, and yet tasked with a variety of roles, from serving food and drink, to conveying items in a manufacturing area, to supporting other functionality such as marketing or telepresence. For this purpose the machine base unit would need to have mobility, navigation, power and computing capabilities, along with a means for attaching various additional items to extend the capabilities.

BRIEF SUMMARY OF THE INVENTION

The invention disclosed with this application is a autonomous mobile system comprising: a means of achieving mobility, a means of navigating, a means of providing autonomous power, and a means of providing general purpose computing.

In some embodiments, the system comprises a base unit capable of sensing its environment and computing navigation instructions to direct the system to move to particular locations and execute particular functions, as directed by a set of programmed instructions.

In some embodiments, a coupling exists on the base unit to attach additional structures and mechanisms that extend its capabilities. These structures may comprise a means for carrying packages or other items, robotic manipulators that can grab and move objects, interactive audio and video displays that support telepresence applications, a means for serving food and drink, and the like. These extensions may be designed to be detachable and interchangeable, or may be designed to be permanently attached to the base unit.

DETAILED DESCRIPTIONS OF EMBODIMENTS OF THE INVENTION

I. Introduction

This application discloses embodiments of an invention for an extensible robotic system comprising: a means to move through the environment, a power source, a computing device, and a navigation system. Furthermore, the embodiments of the invention comprise an attachment means that allow the disclosed system to be a platform upon which additional robotic capabilities can be placed. These capabilities may include, but are not limited to, mechanical manipulation, the dispensing of products or service items, the receipts of objects, the display of audio/video signals for use as telepresence robot, and the like.

In some embodiments, the means to move through the environment shall comprise two wheels in a differential drive arrangement. In some embodiments, these wheels may also comprise brushless DC hub motors.

In some embodiments, the power source may be provided by an electric battery.

In some embodiments, the computing capability may be provided by a single or multi-core microprocessor that executes a sequence of software instructions stored in non-volatile memory.

In some embodiments, the navigation system will comprise sensors and computing capabilities that detect aspects of the environment around it. In some embodiments, the navigation system comprises a room sensor that has the ability to create distance measurements from the robot to walls and other objects in the room, such as a light detection and ranging (LIDAR) system.

Although the above descriptions present an embodiment of the invention, one aspect of the embodiments described here is that they may also serve as a platform for additional functionality. This functionality can take several forms, depending on the field of use, and may be implemented by attaching additional devices and mechanisms to the basic platform. In particular, additional functionality can be added to provide the capability to manipulate physical objects. Or, additional functionality can be added to provide the capability to serve drinks. Or, additional functionality can be added to provide the capability for telepresence, providing video and audio capabilities to both transmit and receive signals through wireless systems and the Internet. Additional functionalities will be disclosed in the present application, and may be known to those skilled in the art.

II. A First Embodiment of the Invention

Shown in FIGS. 1-5 are aspects of a first embodiment of the invention.

Figure 1:
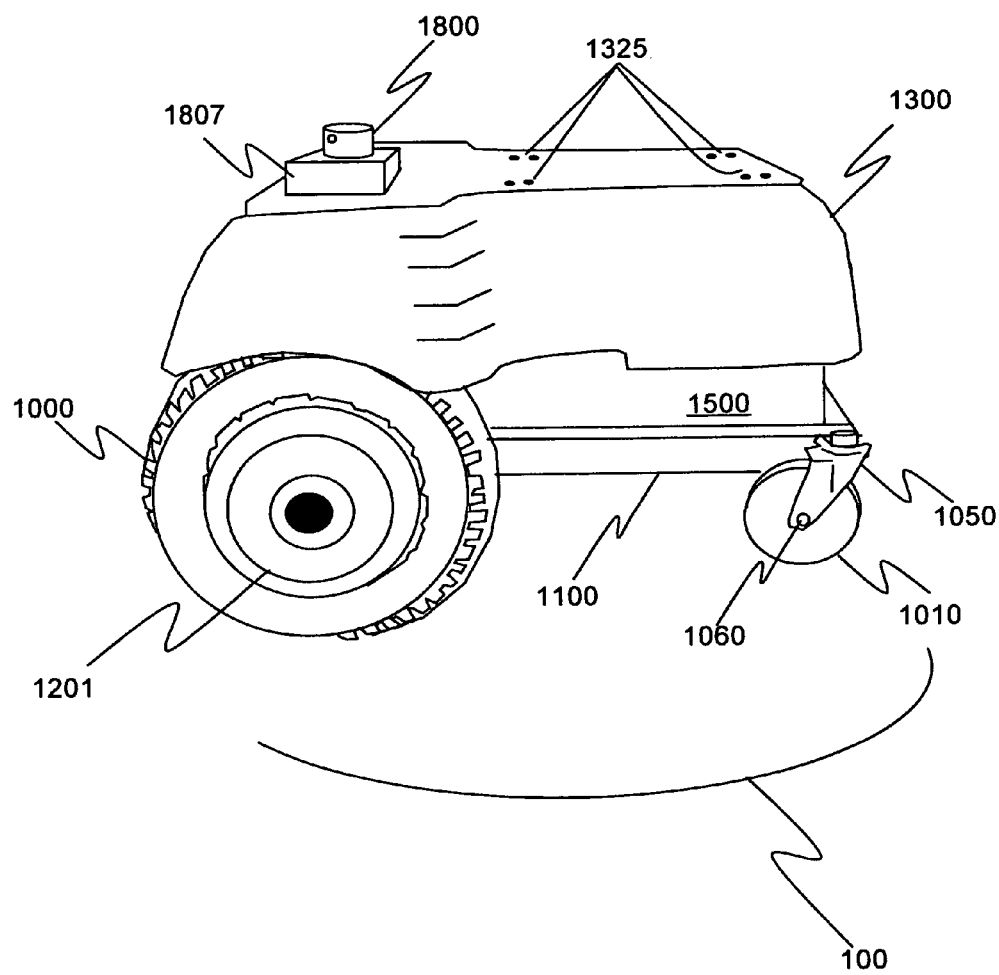
FIG. 1 illustrates a side view of a first embodiment of the invention.
Figure 2:
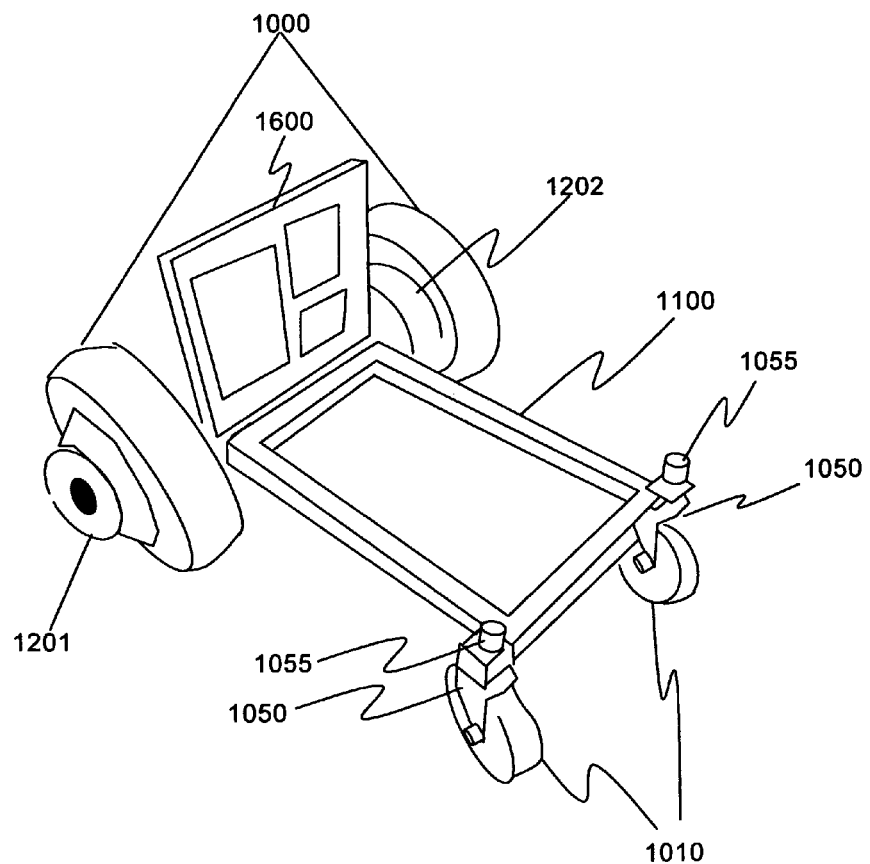
FIG. 2 illustrates a view from above of the embodiment of FIG. 1, with the cover and battery removed.

As illustrated in FIGS. 1 and 2, this embodiment comprises a base unit 100 that comprises a chassis 1100 supported by two front wheels 1000 and two rear wheels 1010. As presented here, the rear wheels have an attachment mechanism 1055 (such as a bolt) that secures a caster-like mechanism that allows the rear wheels to pivot, allowing a change in direction. This mechanism may comprise a fork 1050 supporting an axle 1060 with bearings that passes through the wheels 1010. The rear wheels 1010 can be manufactured from any number of materials known to those skilled in the art, such as a low durometer plastic or a plastic rim with a synthetic rubber or polyurethane tire as the outer surface.

The front wheels 1000 in this embodiment are larger than the rear wheels 1010, and each front wheel 1000 has its own individual fixed axle with screw threads machined into the axle, and is attached to the chassis 1100 using a bolt. The outer surface of the wheels 1000 in this embodiment has a rubber surface with an embossed tread to allow better traction. The front wheels 1000 in this embodiment serve as drive wheels, and comprise brushless DC hub motors 1201 and 1202 within the wheels which can drive the left and right wheels independently, using power from a battery 1500. These brushless DC motors 1201 and 1202 have the stator attached to the axle, while the rotator is affixed to a gear that drives the outer part of the wheel in a planetary gear arrangement.

This embodiment also comprises a cover 1300 supported by a hinge attached to the chassis 1500 at the front, between the front wheels 1000. In this embodiment, on top of, and attached to, the cover 1300, the system has a LIDAR system comprising a LIDAR head 1800 (which typically comprises a laser source and at least one detector) and associated control electronics 1807. In this embodiment, the LIDAR system may be a commercially available system such as the Hokuyo UTM-30LX, manufactured by the Hokuyo Automatic Company Ltd. of Osaka, Japan. The cover 1300 may also comprise means for attaching other accessories, such as holes 1325 that allow a correspondingly designed accessory to be bolted to the cover to provide additional functionality.

Figure 3:
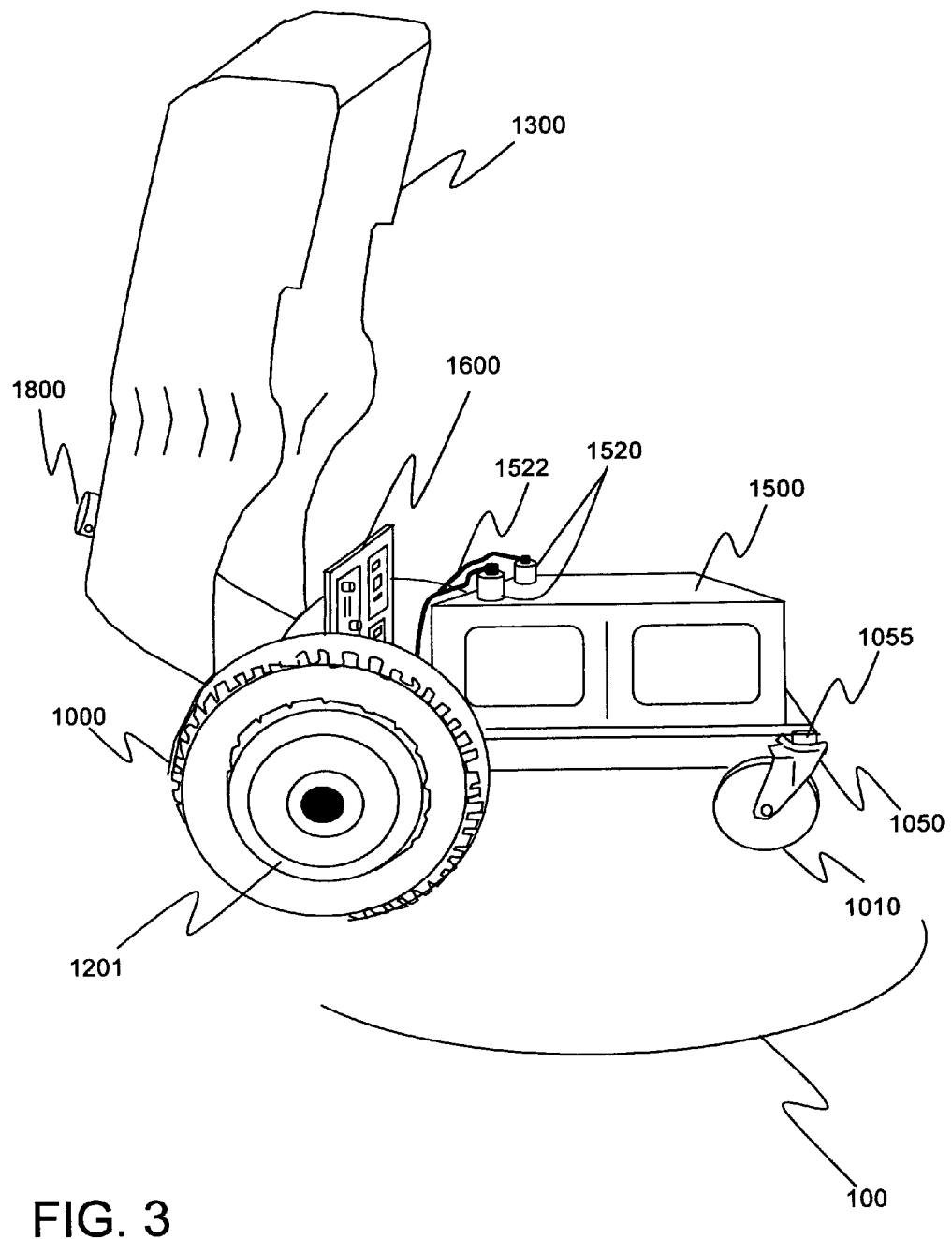
FIG. 3 illustrates a side view of the first embodiment of the invention, with the cover raised and the battery installed.

As shown in FIGS. 2 and 3, with the cover either removed or tilted, the system additionally comprises a support board 1600 with attached printed circuit boards comprising electronic circuits that control the system. As illustrated here, the support board 1600 is mounted vertically, between the front wheels 1000 and in front of the battery 1500. A cable 1522 from the battery attaches the terminals 1520 of the battery to the electronics boards to provide power, and the boards in turn provide power to the hub motors 1201 and 1202.

Figure 4:
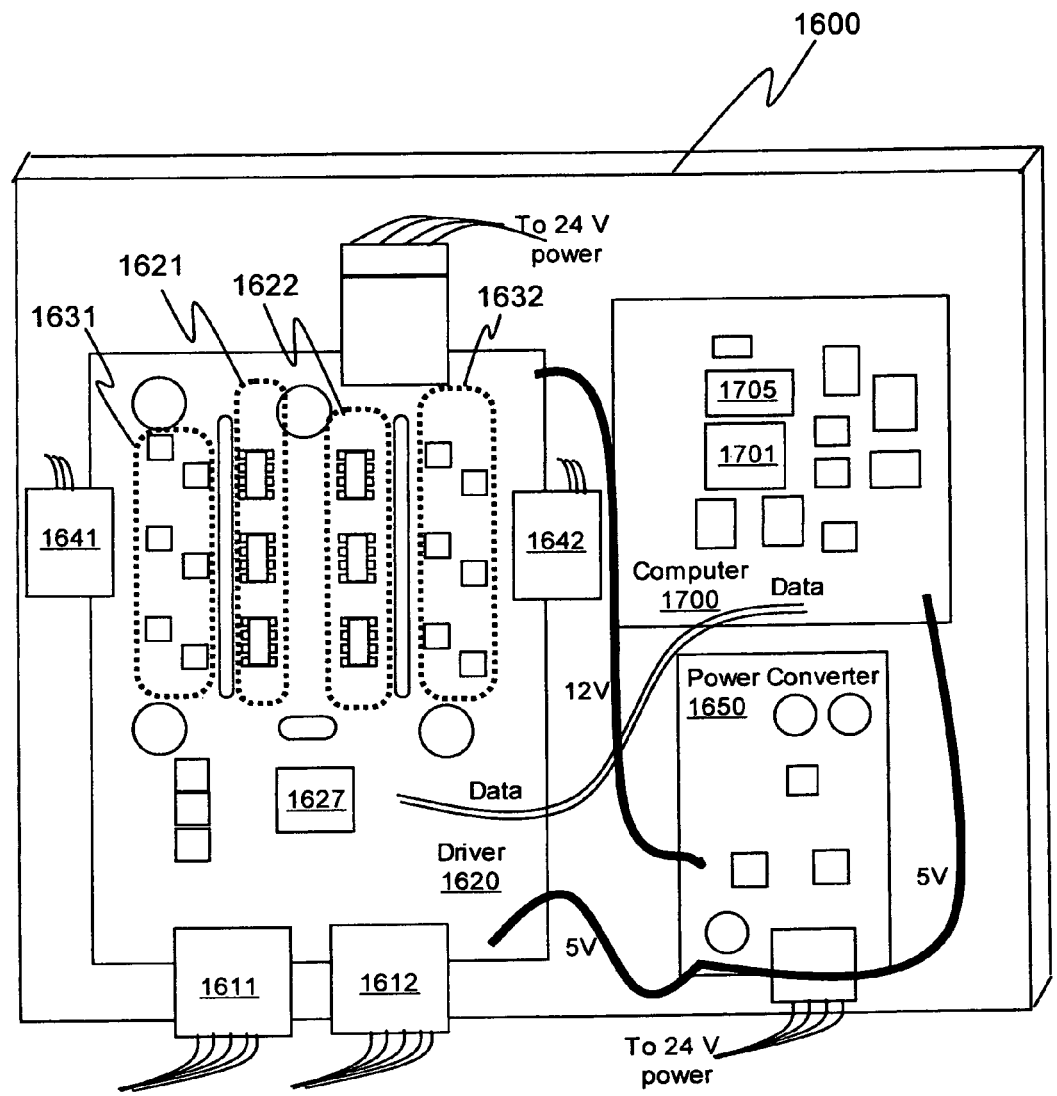
FIG. 4 illustrates a view of a set of printed circuit boards for the first embodiment of the invention.
Figure 5:
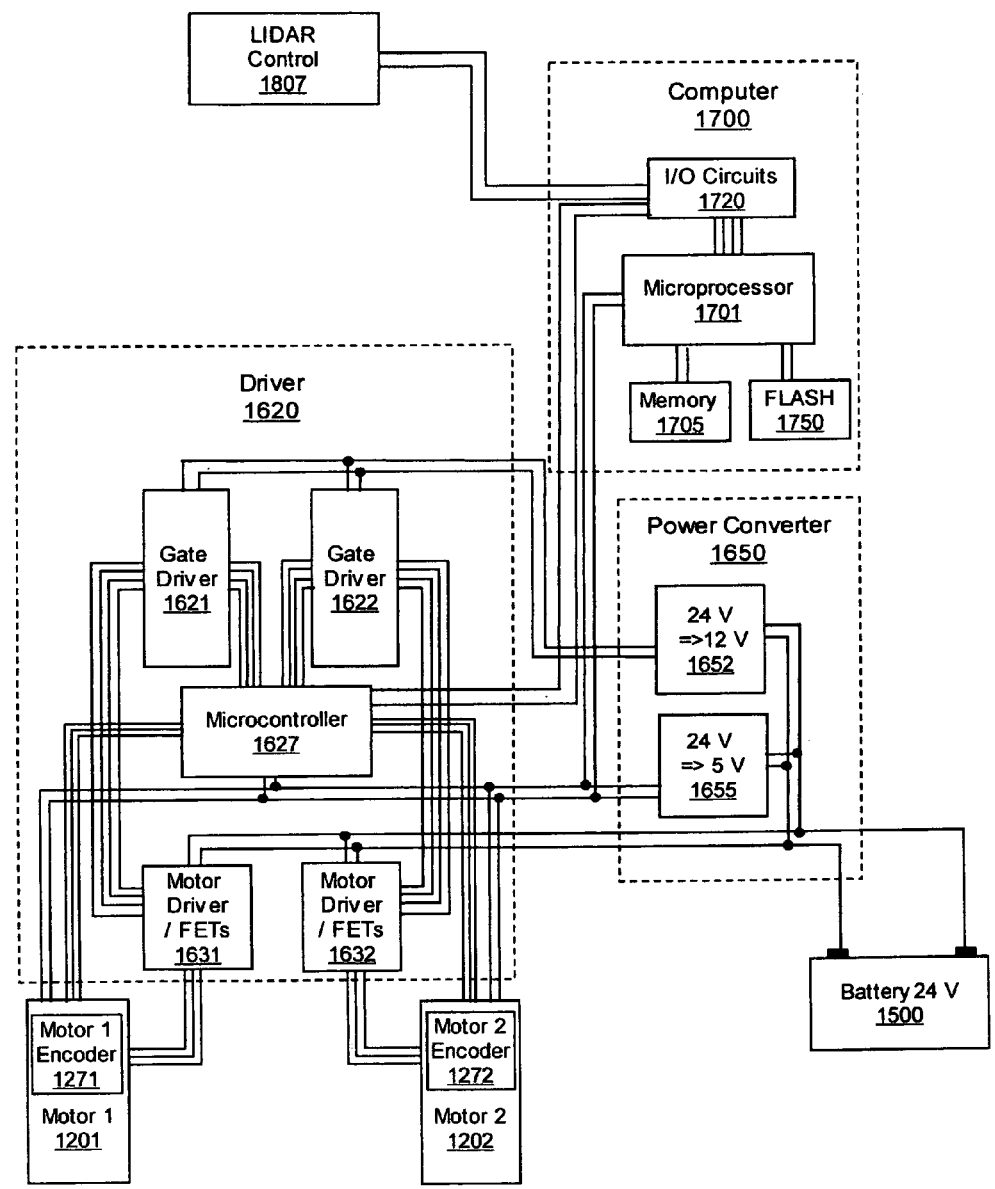
FIG. 5 illustrates a circuit schematic block diagram for the printed circuit boards illustrated in FIG. 4.

FIGS. 4 and 5 illustrate one embodiment of the control circuit boards in more detail. FIG. 4 represents a sketched view of the physical circuit boards as they would be mounted to the support 1600; FIG. 5 illustrates a schematic block diagram of the electronic function.

In the illustrated embodiment, the various electronic tasks have been partitioned between three circuit boards, one serving as a power converter 1650, one serving as a general purpose computer 1700, and one serving as driver 1620. It will be clear, however, that those skilled in the art could design a single circuit board that comprises all these functions, or that these tasks could be partitioned between two, four, five or more circuit boards. Also, although these can be constructed from printed circuit boards (PCBs), other electronic technologies may be used to implements circuits that accomplish the same electronic results.

The power source is a 24-volt deep cycle sealed lead acid battery 1500, which is mounted to the rear portion of the chassis 1100. 24 volts has been chosen for this embodiment because that is the voltage needed to drive the front motors 1201 and 1202 in the front wheels 1000 and further provides excellent acceleration and motor efficiency for motors of this size, while not being so high as to require complex power handling circuitry, a large number of batteries or difficult-to-secure battery charging systems.

Because most electronic circuits require lower voltages, one of the circuit boards 1650 comprises one or more power converters that take as input the 24 volt battery voltage and output 5 volts (for powering digital electronics). In the embodiment presented, this board also comprises additional converters that take as input the 24 volt battery voltage and output 12 volts to provide power for either onboard or accessory systems such as WiFi radios or small motors such as servos that may be required for attached accessories.

The 5 volt output from the 5 volt converter 1655 on the power converter board 1650 in turn provides power for the computer board 1700, which comprises at least one microprocessor 1701 and the associated memory 1705, Flash storage 1750, associated local power regulation and conditioning, one or more ports to allow the insertion of preprogrammed media, a networking port, wireless/WiFi communication circuitry and input/output (I/O) circuits 1720. The I/O circuits 1720 may in turn be connected to the LIDAR controller 1807, which relays raw signals from the LIDAR head 1800 for processing by the navigation system software, stored in the computer flash storage 1750.

In this embodiment, the microprocessor 1701 may be a Rockchip R3188 quad-core ARM A9 microprocessor, such as provided in the commercially available model such as the Radxa Rock, available from the Radxa Corporation of Shenzen, China, which may serve as the main computer board 1700. In such a computer board, software is loaded on to a removable flash device and inserted in the flash socket. This board also comprises on-board Wi-Fi provided. External network connectivity may also be provided.

The 5 volt output from the 5-volt converter 1655 on the power converter board 1650 also provides power for the digital circuits in the driver board 1620, such as the microcontroller 1627 and the motor encoders 1271 and 1272 that provide position information about the wheels.

The microcontroller 1627 directs the motion of the brushless DC motors. In this embodiment, the brushless DC motors comprise Hall sensor encoders, which produce signals related to the position of the coils on the wheels and transmit them to the microcontroller through encoder connectors 1611 and 1612. As will be understood by those skilled in the art, the microcontroller may take the input from the Hall sensors and, using a set of instructions loaded onto the microcontroller for this purpose, determine which coils on the motor should be switched on to achieve a rotation of the wheel. The microcontroller switches these coils on by activating pulse width modulated (PWM) I/Os on the microcontroller, which in turn connect to gate drivers 1621 and 1622, which in turn switch on the motor driver FETs 1631 and 1632, which in turn provide power through connectors 1641 and 1642 to the motor coils themselves.

The 12 volt output from the 12 volt converter 1652 on the power converter board 1650 provides 12V DC power to the Gate drivers 1621 and 1622, which are used by the gate driver to run a boot-strap power circuit that enables the gate driver to generate signals powerful enough to switch the FETs 1631 and 1632 on completely and quickly. The signals from the gate drivers enter the FET combinations 1631 and 1632. These FETS are arranged in three half-H bridge arrangements, and govern the application of the 24-volt source to actually provide power to the hub motors 1201 and 1202. As will be understood by those skilled in the art, the brushless-DC motors 1201 and 1202 typically comprise three sets of coils, and in a typical configuration, two are activated at any one time in order to cause the motor to move. In a usual configuration, one coil is activated to push and another is activated to pull the rotator, and the Hall sensor determines which two are activated at any one time and the microcontroller as described above. As the motor turns, the Hall sensor detects this motion and switches the appropriate set of coils on and off.

In this embodiment, this microcontroller may also accept coded instructions through a data connection from the microprocessor 1701 sent via the I/O circuitry. These coded instructions may comprise many different instructions, including descriptions the motion to be achieved by the wheels, or instructions to the microcontroller to perform other system maintenance/system monitoring tasks.

An example of an instruction describing motion would be the transmission of a target speed to be achieved over a predetermined time. The microcontroller will be programmed in such a manner as to continuously monitor and calculate the speed of the wheels using the signals arriving from the encoders associated with each wheel, and can thus determine the difference between the targeted speed and the desired speed. The microcontroller can then convert this difference in to an instruction to the microcontroller's onboard pulse width modulator (PWM) system to increase or decrease the duty cycle of the PWM signal. This PWM signal is fed through the gate drivers 1621 and 1622 to the motor driver FETs 1631 and 1632 and results in a corresponding increase or decrease in the current directed into the coils of the motor, causing the motors to go faster or slower.

Through a similar sequence of operations, the direction of motion may also be controlled, in that an instruction from the microprocessor to turn left or turn right can be converted by the microcontroller to signals to drive the left wheel 1201 and right wheel 1202 at different rates, turning the system as it moves.

The microcontroller 1627 also performs other functions useful as part of the system. In particular the microcontroller may, upon receipt of an instruction from the microprocessor 1701, report the position of the wheels, the angular distance moved by the wheels or the speed by calculating this information from information derived from the motor encoders back to the microprocessor 1701.

The microcontroller 1627 may also automatically stop the wheels from moving if it detects an abnormality, in particular if it detects an abnormality in the voltage received at the driver board. This functionality may be provided on the microcontroller by the use of onboard programmable analog circuitry that may be provided with the microcontroller.

The microcontroller 1627 may also provide test functionality to test the driver circuit, either for manufacturing or system management purposes. The microcontroller program would direct the microcontroller to use its onboard analog to digital converter (ADC) to measure voltages at all pins connected to other parts of the circuit at start up and during operation. It will compare the readings from its onboard ADC to preprogrammed normal ranges and when the voltages are outside the normal range it would generate an error code that, at the request of the microprocessor 1701 would be reported back to the microprocessor. Alternatively the microcontroller may take other actions to alert a user that there is an error such as direct the wheels to move back and forth with a frequency in the audible range thus creating a characteristic humming sound that would be noticed by a user or elevate the voltage on one of the microcontroller's output pins for measurement by a user.

III. Alternative Variations

The previous description has disclosed one embodiment of the invention. However, each of the elements of the invention may have variations that may be used, singularly or in various combinations.

III.a. Alternative Options for the Drive Mechanism.

The above embodiment discloses a base unit 100 comprising two drive wheels 1000 and two additional support wheels 1010. Additional embodiments in which only one additional support wheel (with three wheels in total) may be employed. Likewise, embodiments configured with additional wheels, such as a configuration with three wheels on each side (which may be more flexible for crossing uneven terrain) may be employed.

In such a six wheel configuration, two wheels may be the drive wheels, as described above, while the other wheels provide passive support; or additional encoders and motors may be provided for the additional wheels, and additional programming may be used to use two, four, or six wheels or any subset thereof to drive and navigate the system.

Likewise, in any of the configurations, each of the wheels may be provided with a motor and encoder to be independently driven. Such an "all-wheel drive" system may offer certain advantages for use in certain environments or for travel over certain types of surfaces or terrain.

In the first embodiment described above, brushless DC hub motors 1201 and 1202 were employed. However, other embodiments employing DC motors comprising brushes may also be designed by those skilled in the art.

In the first embodiment as described above, individual wheels are driven by motors independently, and accomplishing motion of the system with a particular direction or speed is coordinated by the microcontroller and microprocessor. In other embodiments, a single motor may be provided to provide motive force, with those drive wheels driven, for example, using a differential to transmit power to a subset of the wheels. In such a system, steering may be accomplished using a second system, such as an Ackermann steering geometry, or any other steering configuration known to those skilled in the art.

Figure 6:
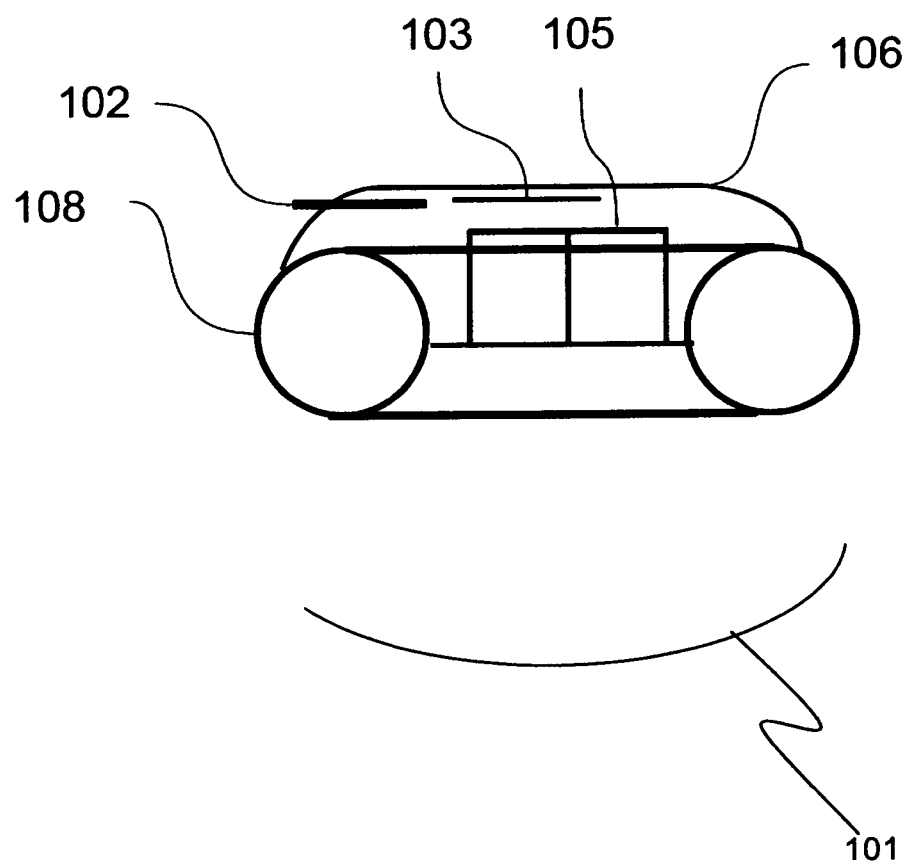
FIG. 6 illustrates an embodiment of the invention in which the drive system comprises a continuous track system.

Alternatively, in some embodiments, instead of the wheels driving the system directly, the drive system may comprise a continuous track system with a continuous band of treads 108 driven by two or more wheels, as is illustrated in FIG. 6. In this illustration, the base unit 101 comprises a room sensor 102 with a computer system 103. The computer system may comprise of an onboard computer or computers, or it may comprise of a system to connect to an off-board or "cloud" based computing system or service, or it may be configured as some combination of these two options. The entire arrangement is powered by a power-source 105 such as a battery and held together by a set of structural members 106 that may completely or partially enclose many of the systems. In this arrangement there may be one or more casters 107 that create stability of the system without the need for active balancing. Such systems as used, for example, on a larger scale in military tanks or on farm equipment, can distribute the weight over a larger area, and provide better traction on rough ground.

Figure 7:
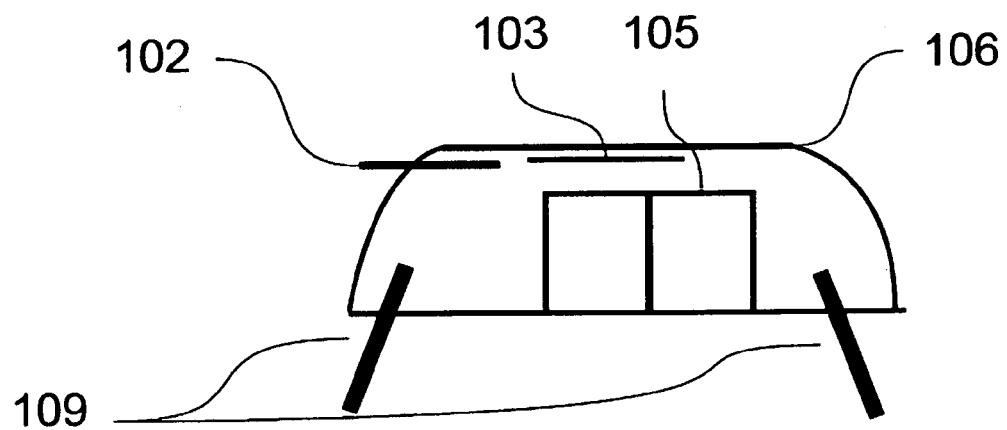
FIG. 7 illustrates an embodiment of the invention in which the drive system comprises legs.

Alternatively, in some embodiments, legs 109 may be used to support the system and provide motion and direction, as illustrated in FIG. 7. The programming to balance the system on legs as they "walk" may be more involved than the instructions needed to drive wheels (which are almost always in contact with the ground), but walking offers more flexibility for moving through very irregular terrain.

Figure 8:
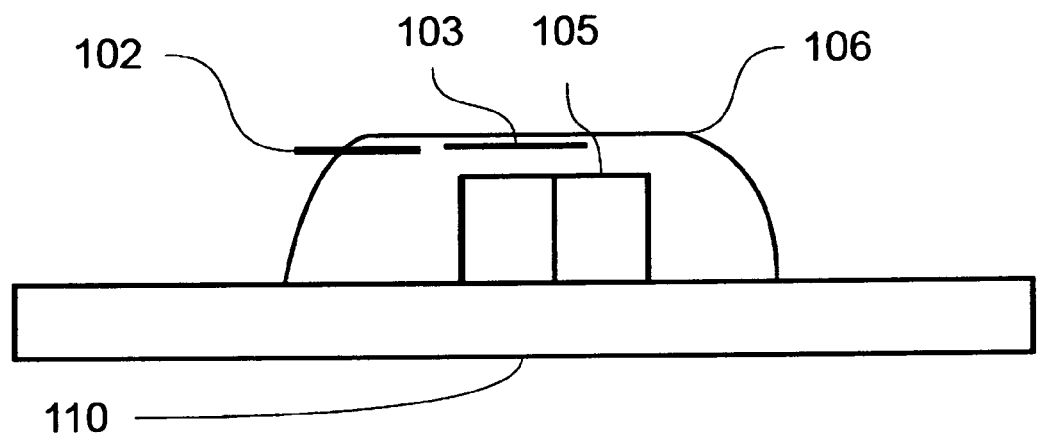
FIG. 8 illustrates an embodiment of the invention in which the drive system comprises a forced air "hover-lift" mechanism.

In alternative embodiments, motors that drive air downwards in a hover lift arrangement 110 may be used to allow the system to operate as a hovercraft, supported by a cushion of air, as illustrated in FIG. 8.

Figure 9:
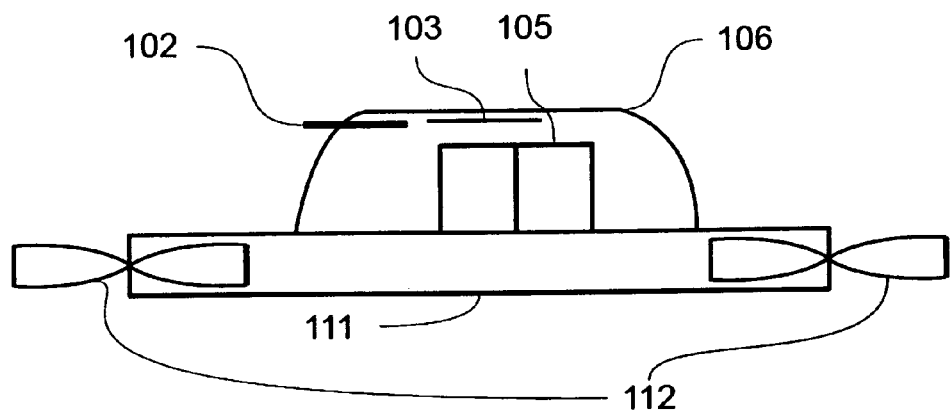
FIG. 9 illustrates an embodiment of the invention in which the drive system comprises several rotor-lift mechanisms.

In some embodiments, at illustrated in FIG. 9, rotors 112 to provide lift using a rotor-lift arrangement 111 may also be used to elevate the system above the surface, and differential drive for the various rotors may allow the system to move up or down, left or right, forward or backward, or any other combination of motions in three-dimensional space.

III.b. Alternative Options for the Battery.

The system also comprises a power source. This power source could be a conventional battery, as in the embodiment described above, in which the battery was a deep cycle sealed lead acid battery or set of batteries. Alternative embodiments may comprise one or more of a lead acid battery, a deep cycle lead acid battery, a sealed lead acid battery, an absorbed glass mat (AGM) lead acid battery, a gel lead acid battery, a nickel-cadmium (NiCd) battery, a nickel-metal-hydride (NiMH) battery, a lithium battery, a silicon-mediated lithium battery, a lithium ion battery, an alkaline battery, or power systems comprising combinations thereof, as may be known to those skilled in the art.

Alternative embodiments may also comprise non-battery power sources, such as a fuel cell device, a flywheel energy storage system, or any number of alternative energy storage systems known to those skilled in the art. Alternative embodiments could have a system that converts chemical or other energies to electrical power such as a fuel cell, a hydrogen fuel cell, a hydrocarbon powered heat engine such as an internal combustion engine with a dynamo attached, a microwave transmission energy power source, an inductive energy source or a Carnot engine. Alternative embodiments could have combinations selected from any of the above storage system and any of the above conversion systems.

III.c. Alternative Options for the Computer.

The above-described first embodiment had a Radxa Rock as the main computer board that additionally had software loaded onto a removable flash device and inserted in the flash socket, and also included on-board Wi-Fi provided. As will be understood by those skilled in the art a number of alternative microprocessors are possible including Intel architecture devices including Intel core i3, i5, i7 microprocessors or Intel Xeon products manufactured by the Intel Corporation of Santa Clara, Calif.; AMD brand microprocessors manufactured by Advanced Micro Devices of Sunnyvale, Calif.; ARM and ARM compatible variants including, Tegra processors such as the including Tegra, 3, 4, 5, K2, K3 provided by Nvidea of Santa Clara, Calif.; Snapdragon processors including, 800, 801,805 provided by Qualcomm Corporation of San Diego, Calif.; Exynos Processors, 5420, 5410 manufactured by Samsung Electronics of Suwon, South Korea; OMAP Processors manufactured by Texas Instruments of Dallas, Tex.; Rockchip processors manufactured by Fuzhou Rockchip Electronics company of Fuzhou, China; Allwinner A10, A20 processors manufactured by Allwinner Technology of Zhuhai, China; or any other microprocessor known to those skilled in the art.

The microprocessors could be mounted in a number of different development boards including the Radxa Rock manufactured by the Radxa Corporation of Shenzen, China; Cubieboard manufactured in Shenzhen, China; the Nvidia K1 development kit produced by Nvidia Corporation of Santa Clara, Calif.; and various other single board computers supported by various foundations and organizations, such as the Odroid X1, X2, X3, X4, U1, U2, U3, U4 produced by Hardkernel Co., Ltd. of South Korea; Cubieboard; the PandaBoard; the Raspberry Pi; and various motherboards and blades manufactured by conventional microprocessor suppliers such as Intel Corporation of Santa Clara, Calif. and Advanced Micro Devices (AMD) of Sunnyvale, Calif. Optional components for such boards include WiFi connectivity, cellular wireless connectivity, Ethernet connectivity, and other connectivity options that will be known to those skilled in the art. Data storage options may comprise non-volatile memory devices such as flash storage, hard disks, external flash sockets, and may additionally provide connectivity for various I/O devices, including monitors, video displays, audio output and the like.

In the above described first embodiment, software is loaded on to the device on a removable flash device and software updates are achieved by connecting to a cloud based computing systems over wireless connections using Wi-Fi protocols, as directed by an operator. In alternative embodiments this connectivity could occur using wireless cellular connectivity, or alternative wireless data transmission techniques that will be known to those skilled in the art. Software updates could occur automatically or manually. In the above-described first embodiment, processing tasks were carried out on the onboard microprocessor. In alternative embodiments these processing tasks could be shared with, or carried out by, auxiliary processing units, such as auxiliary microprocessors or graphics processing units (GPU). Such additional processing may also be provided by cloud based processing systems using web-based connectivity.

III.d. Alternative Options on Navigation System.

The above-described first embodiment described a navigation system comprising LIDAR navigation using the Hokuyo UTM-30LX. Alternative embodiments using other LIDAR systems will be known to those skilled in the art. Alternative 2-D and 3-D range finding methods may also be used. Some embodiments may comprise 3-D cameras, such as the Xtion or Xtion Pro models produced by Asustek of Beitou District, Taipei, Taiwan; the sensor from an Xbox Kinect produced by Microsoft Corp. of Redmond, Wash.; or other alternative 3-D cameras that will be known to those skilled in the art.

Figure 10:
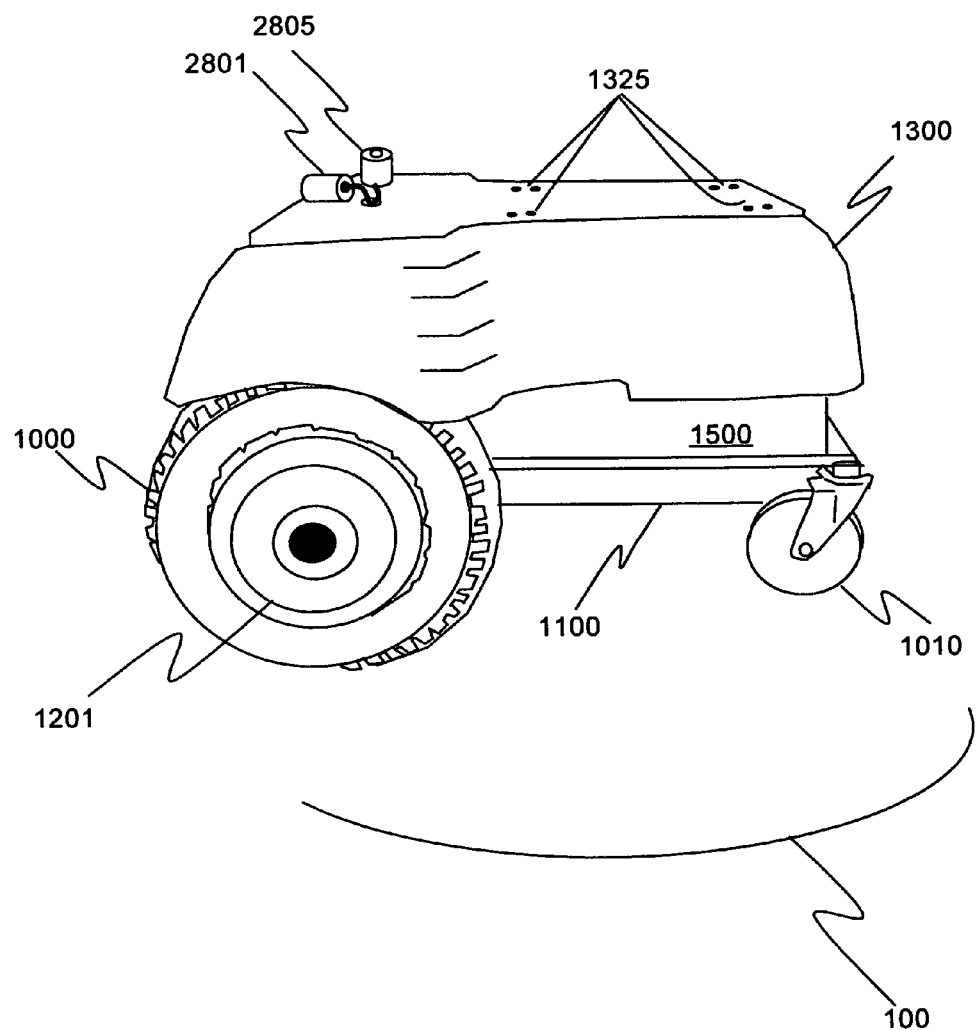
FIG. 10 illustrates a side view of an embodiment of the invention in which the navigation system comprises a pair of a pair of video cameras.

In an alternative embodiment, a system comprising two cameras may be used, one looking up and one looking ahead. This is illustrated in FIG. 10. These cameras may be conventional, commercially available cameras such as those found in cell phones for example the OV5647 model or any other image sensor model manufactured by Omnivision Corporation of Santa Clara, Calif., or the MT9M033 model or any other image sensor model manufactured by Aptina of San Jose, Calif., or common USB cameras such as the Logitech C 170, manufactured by Logitech of Lausanne, Switzerland or others that may be known to those skilled in the art. The camera may be powered by either a local battery, or through a connection to one of the printed circuit boards. The camera signals in this embodiment will be provided by a wired connector to the computer 1700, just as the LIDAR signals were provided in the previously described embodiment.

In this embodiment, a horizontal camera 2801 faces forward, looking in front of the base unit 100. With suitable image processing, this can provide a certain amount of navigation information, such as determining if there is an object ahead to be avoided, or if there is a human being in the area that needs attention. In this embodiment, the second camera is a vertical camera 2805, which looks up. This camera can be used for navigation to a reference pattern. In one embodiment, the software governing the system will comprise a pre-programmed map of, for example, the patterns on a ceiling of a room. By watching the patterns with the vertical camera 2805 and correlating to this internal map, the robot may determine where it is and navigate accordingly. As will be understood by those skilled in the art, alternative embodiments may enable the system to navigate with a single camera, two cameras, or more than two cameras.

Alternative room sensing technologies may also be employed to provide information to the system about the local environment, such as the HC-SR04 ultrasonic ranging module manufactured by Cytron Technologies of Kuala Lumpur, Malaysia, or other scanning acoustic or sonar arrays.

In other embodiments, sensing technologies comprising range finding infrared devices such as designed by XYZ Interactive Technologies Inc. of Toronto, Ontario, or optoelectronic wide-angle distance measuring sensors manufactured by Sharp Corporation of Osaka, Japan; or light arrays that comprise arrays of light sources and light sensors configured to provide information about the room, or RADAR systems based on CW RADAR, and the like. In an alternative embodiment the room sensor will be a combination of one or more of the list of LIDAR, generalized IR sensor, sonar or RADAR.

Figure 11:
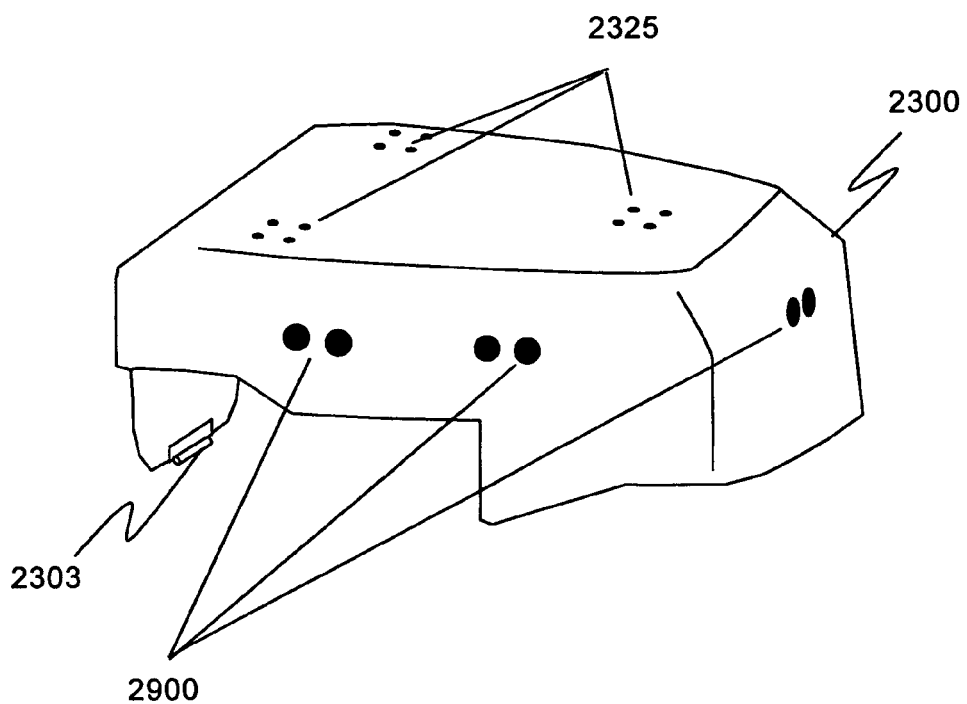
FIG. 11 illustrates a view the cover for an embodiment of the invention in which the navigation system comprises multiple sensor systems or multiple sensor devices used in an array.

In another embodiment, instead of having camera or LIDAR sensors mounted to the top of the base unit 100, configurations may be designed in which arrays of sensors are mounted on the inside of the cover 1300 of the base unit. A cover 2300 for such a unit is illustrated in FIG. 11. As in the previous embodiment, this cover is designed to attach to the chassis 1100 with a hinge 2303, and various holes 2325 in the cover have been provided to allow attachment of accessories.

However, in this configuration, one or more sensor systems are mounted inside the cover, and transmit and receive their signals through various apertures 2900 in the wall of the cover 2300. In this embodiment the signals may be ultrasonic signals or they may be visible or infrared light. The transmit and receive functions may act as individual pairs or they may act as an array of generators or sensors. In the case of the data being ultrasonic, the timing of the receipt of the signals may be gathered. In the case of ultrasonic or visible or infrared light the intensity of the returned signal may be gathered. In the case of these systems acting as an array, the data from these sensors would be communicated to the microprocessor 1701. The data would then be processed by applying an inverse function that would generate an internal representation of the environment, such as a room shape and size, from the sensor data. This inverse function may be an inverse matrix that would be applied to the set of incoming data organized as an input matrix and applied together using matrix multiplication.

The navigation system may further comprise additional electronics to manage the data from the room sensor. In a preferred embodiment these electronics comprise a microcontroller, or in alternate a computer system. In such an embodiment the computer takes in data from the sensors and executes a set of instructions in a predetermined sequence that seeks to match the sensor data to a location in a pre-stored electronic map, thus determining its location in that electronic map, and thus using this information to make decisions about where to go in that map. In an another embodiment the navigation system shall contain a camera and shall use, either alone, or in concert with the computer system, the camera to recognize either fiducial markings, people or other objects in the room as a reference for navigation purposes. In this embodiment the images are matched to images stored in a pre-stored map. In an alternative embodiment of the invention the camera may be used such that the robot is directed to navigate towards people in order to provide service.

In other embodiments the system may navigate using data derived from the wheel encoders and may combine this data with data from other sensors on the robot or other systems already described to make a decision to direct the movement of the system. In this embodiment the microcontroller 1627 would report to the computer 1700 data derived from the encoders, this information may include the position of the wheels, the angular distance moved by the wheels or the speed of the wheels. The computer would use this data to make a decision directing the motion of the system and may combine this data with data derived from other sensors on the robot.

The navigation system may also comprise an algorithm to take input data from the available sensors on the robot and direct the motion of the robot in a space. The navigation decisions may be made by reference to a pre-stored map, or the navigation map may be constructed by the robot while it navigates. The navigation decisions may be made in reference to pre-stored criteria, such as a goal to move towards an object that has been detected by the cameras and recognized by a computer that has loaded upon it a set of instructions that constitute a vision recognition algorithm. The pre-determined criteria could be to move towards or away from a sensed object, temperature, light gradient, scent, sound, ultrasonic sound, hypo-sonic sound, electromagnetic signal or gradient, physical disturbance, tactile stimulation or any other thing that may be sensed by sensors know to those skilled in the art. A combination of these criteria may be used, to make a navigation decision or a combination of these criteria and a map may be used to make a navigation decision.

IV. Additional Accessories and Extensions

Figure 12:
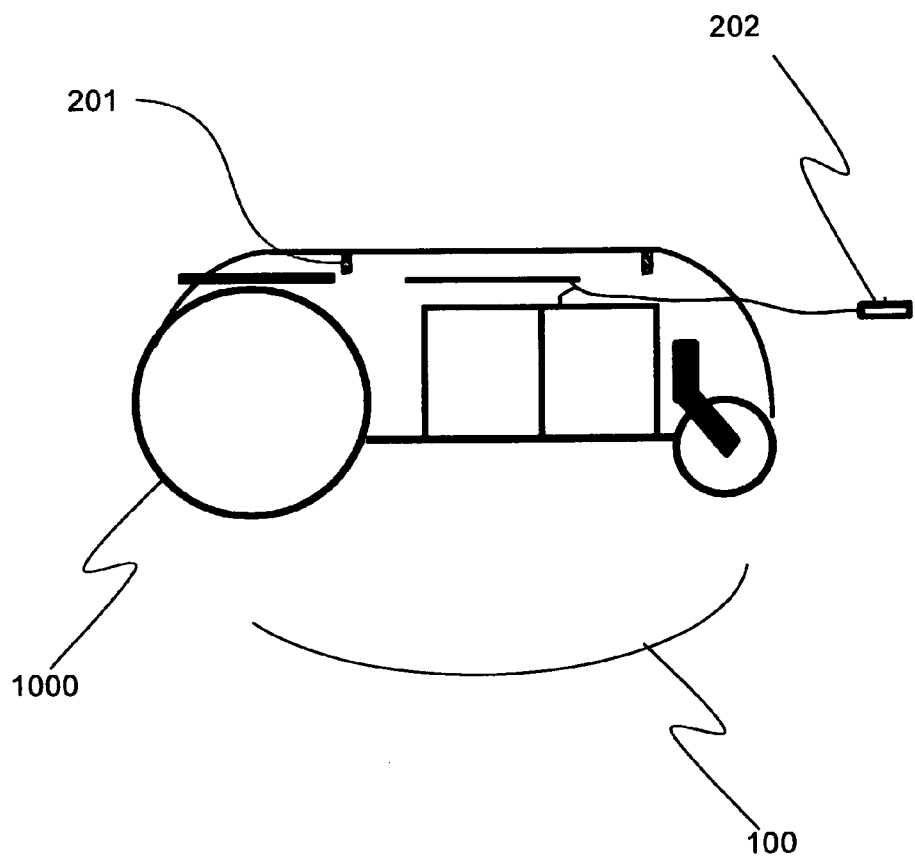
FIG. 12 illustrates an embodiment of the invention comprising an electrical coupling.

In the above-described first embodiment, the system cover 1300 may comprise a pattern of holes 1325 that allow additional items to be attached to the base unit 100, allowing the base unit to serve as a platform for structures and machines that extend the functionality of the robot. This coupling can be of a variety of types, as will be known to those skilled in the art. As illustrated in FIG. 12, the coupling could comprise a means for a physical coupling 201, such as boltholes or threaded screw holes that have been tapped into the cover, to allow additional structures and accessories to be attached to the base unit 100. The coupling could also comprise an electrical coupling 202 such as a pigtail cable with a connector to transfer power and data to the accessory. The coupling could also comprise an optical coupling to transfer data and/or power. The coupling could also be entirely virtual, in that it comprises of a standardized set of interface protocols for communication from one electronic device to another over a general-purpose data connection. This data coupling may comprise a data connection that is transmitted optically, or over infrared, radio or using any part of the electromagnetic spectrum, either through free space or a waveguide such as an electric wire or a fiber optic cable.

Figure 13:
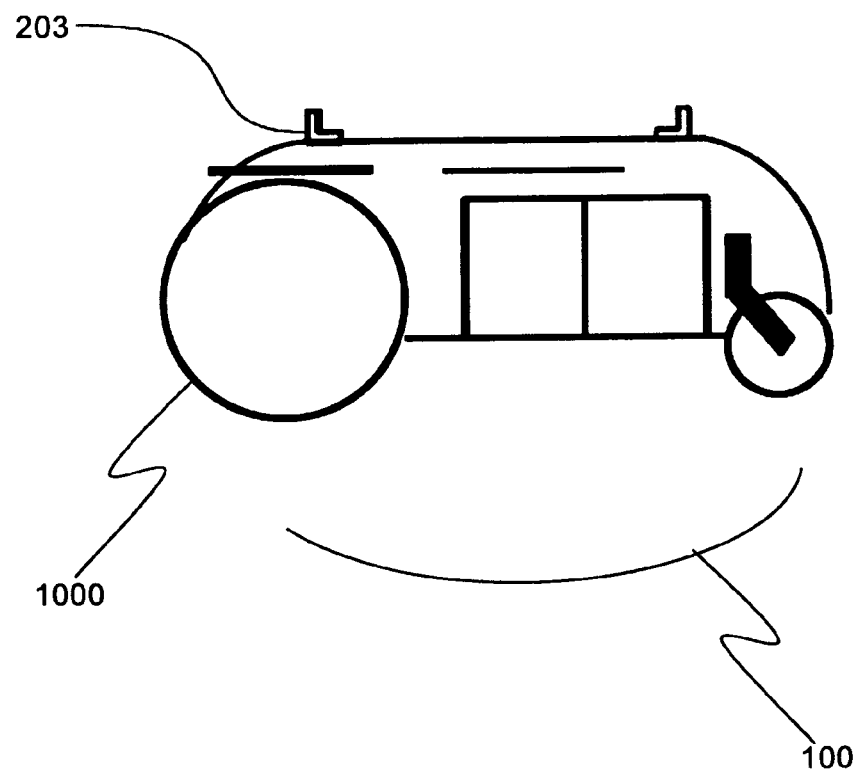
FIG. 13 illustrates an embodiment of the invention in which an attachment can be secured to the platform with quick release clasps.

FIG. 13 illustrates an embodiment in which the coupling comprises quick release clasps 203 that can be used to attach an additional structure or accessory.

Figure 14:
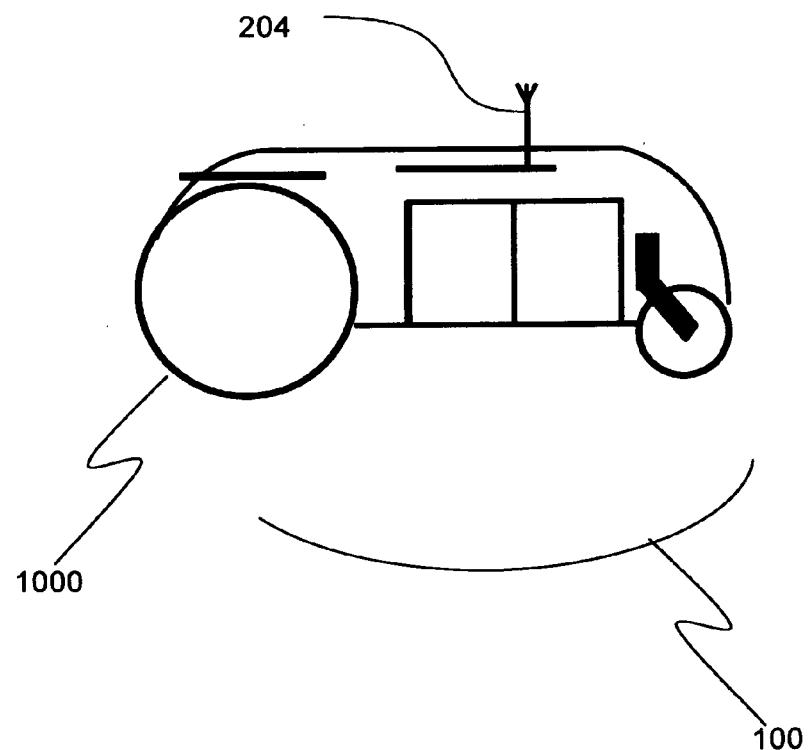
FIG. 14 illustrates an embodiment of the invention in which an attachment can comprises an antenna for wireless communication.

FIG. 14 comprises an alternative embodiment in which the coupling comprises a signal transmission device such as a radio antenna 204 or a laser transmission device or an acoustic signal transmission device that provides any type of information connectivity with the accessory. As someone skilled in the art will recognize, a large number of anticipated signals or physical couplings could be used to connect the device to external accessories to provide service.

The accessories themselves may comprise a large variety of structures, devices and machines.

Figure 15:
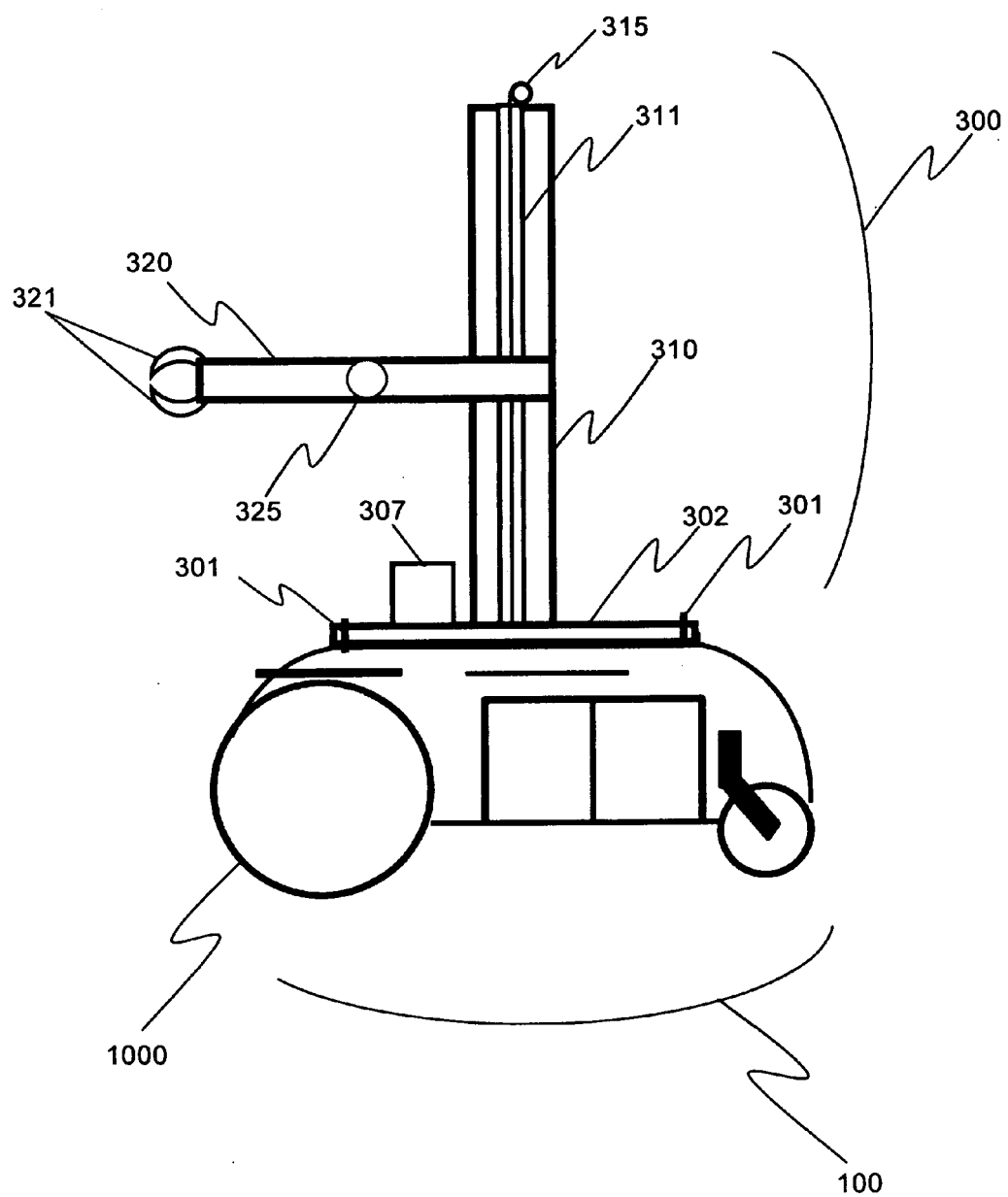
FIG. 15 illustrates an embodiment of the invention in which an attachment comprising a manipulator arm has been attached to the platform.

In one embodiment, as illustrated in FIG. 15, the accessory 300 comprises one or more manipulator arms 320. In the embodiment as illustrated, the accessory 300 comprises an attachment plate 302 that is bolted to the base unit 100 using bolts 301. Connected to the plate 302 is a vertical support 310 that allows the manipulator arm 320 to move up and down, pulled by a motor 315 along a track or tracks 311. Position encoders may be used to determine the elevation along the track, or the elevation may be determined by a servo motor configuration.

In this embodiment, the manipulator arm 320 may comprise joints 325 that allow it to bend, and may comprise a single arm or may comprise configurations with multiple arms that allow a large object to be held by the force exerted by two opposing arms, or released when that force is removed. Any given arm 320 may additionally comprise manipulators 321 that may also be independently controlled to pinch or grab objects, and also release them.

The vertical motion, horizontal motion, and bending motion of individual arms, joints, and manipulators may be controlled electronically using control elements such as servo motors governed by a computer 307 attached to the accessory 350. This accessory 300 and the computer 307 may have its own source of power, such as a battery, built into the accessory, or may in turn may be powered by a connector that links it to the battery 1500 within the base unit 100 or to the circuit board 1600 within the base unit 100.

In other embodiments, the on-board computer 1700 in the base unit 100 may provide the additional computations and instructions needed by the various servo motors for control the manipulator arms, and a data connection between the circuit board 1600 and the accessory 300 may also be needed.

Figure 16:
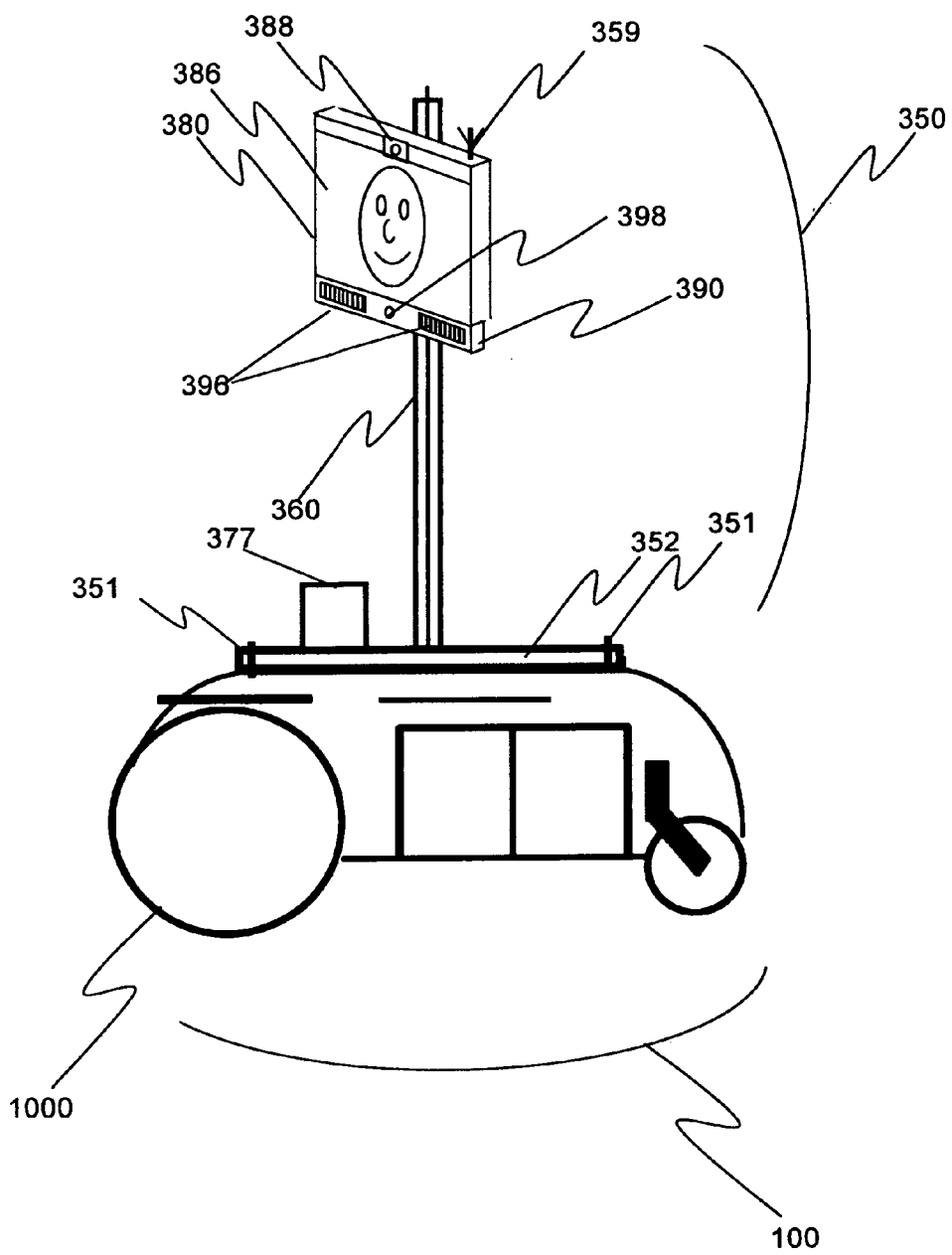
FIG. 16 illustrates an embodiment of the invention in which an attachment comprising an audio and video display has been attached to the platform.

In one embodiment, as illustrated in FIG. 16, the accessory 350 comprises an audio/video system for use as a telepresence device. In the embodiment as illustrated, the accessory 350 comprises an attachment plate 352 that is bolted to the base unit 100 using bolts 351. Connected to the plate 302 is a vertical support 360 that supports a video system 380 comprising a display 386 and a video camera 388, along with an attached audio system 390, comprising speakers 396 and a microphone 398. Connectivity for the system is provided by one or more antennas 359.

The display 386 and speakers 396 allow a person at a remote location to show their face and facial expressions and have their voice heard as if they were in the position of the robotic accessory, while the video camera 388 and microphone 398 allow the person in the remote location to see what is happening in front of the accessory 350, as if they were standing in the location of the accessory 250.

The motion of the telepresence accessory 350 and base unit 100 may be governed by a computer 377 attached to the accessory 350. This accessory 350 and the computer 377 may have its own source of power, such as a battery, built into the accessory 350, or may in turn may be powered by a connector that links it to the battery 1500 within the base unit 100 or to the circuit board 1600 within the base unit 100.

In other embodiments, the on-board computer 1700 in the base unit 100 may provide the additional computations and instructions needed by telepresence accessory, and a data connection between the circuit board 1600 and the accessory 350 may also be needed.

Figure 17:
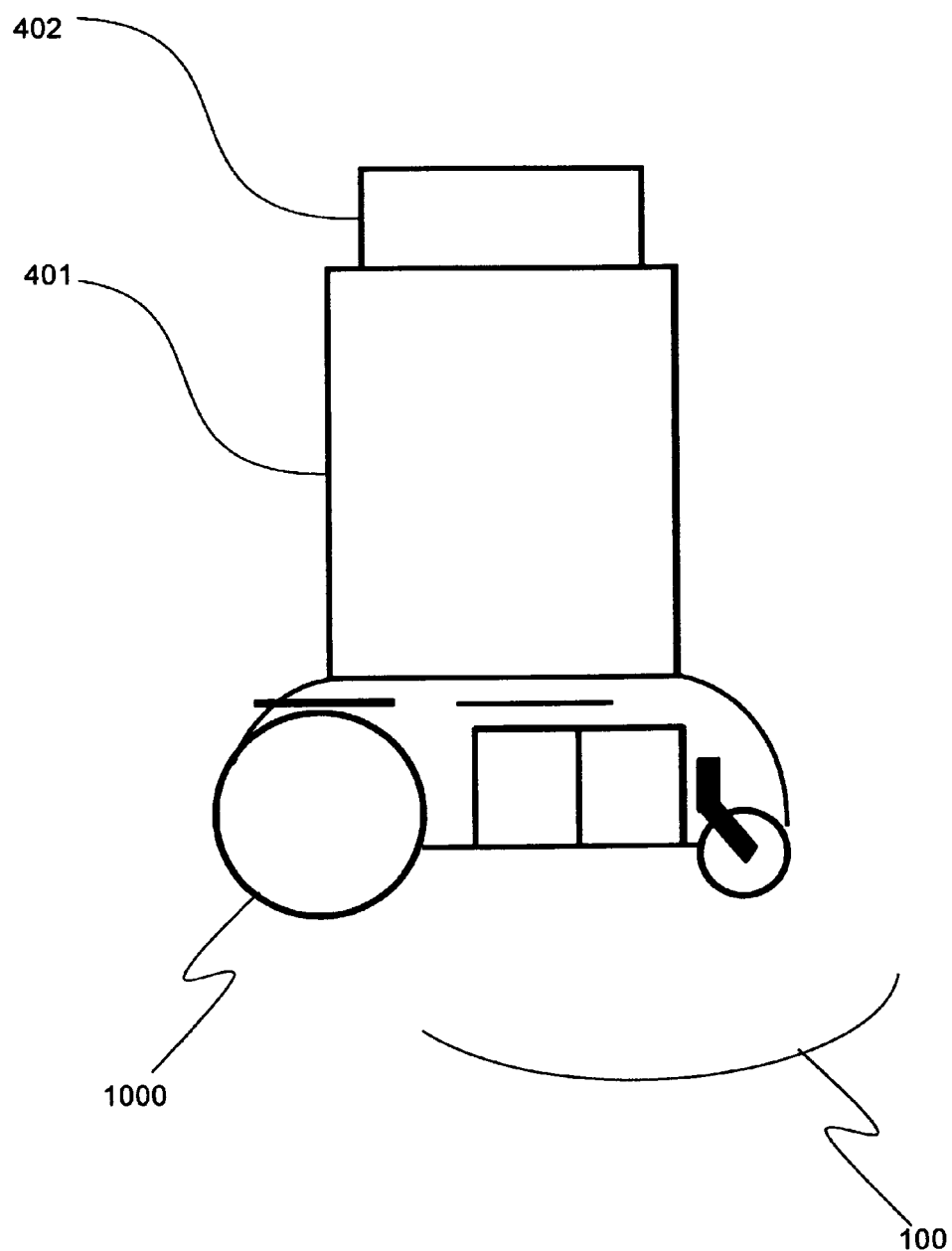
FIG. 17 illustrates an embodiment of the invention in which an attachment comprising a mechanism for carrying and delivering items has been attached to the platform.

FIG. 17 illustrates a configuration in which a structure 301 is attached for delivering other items 402. These items may be food or drink items, they may be service items, parts, accessories, items used by humans, items used by animals, items used by machines, items used by other robots, etc. These may be items that have a packaging or items with no packaging. They may be solid, liquids, gasses or any combination of these.

Figure 18:
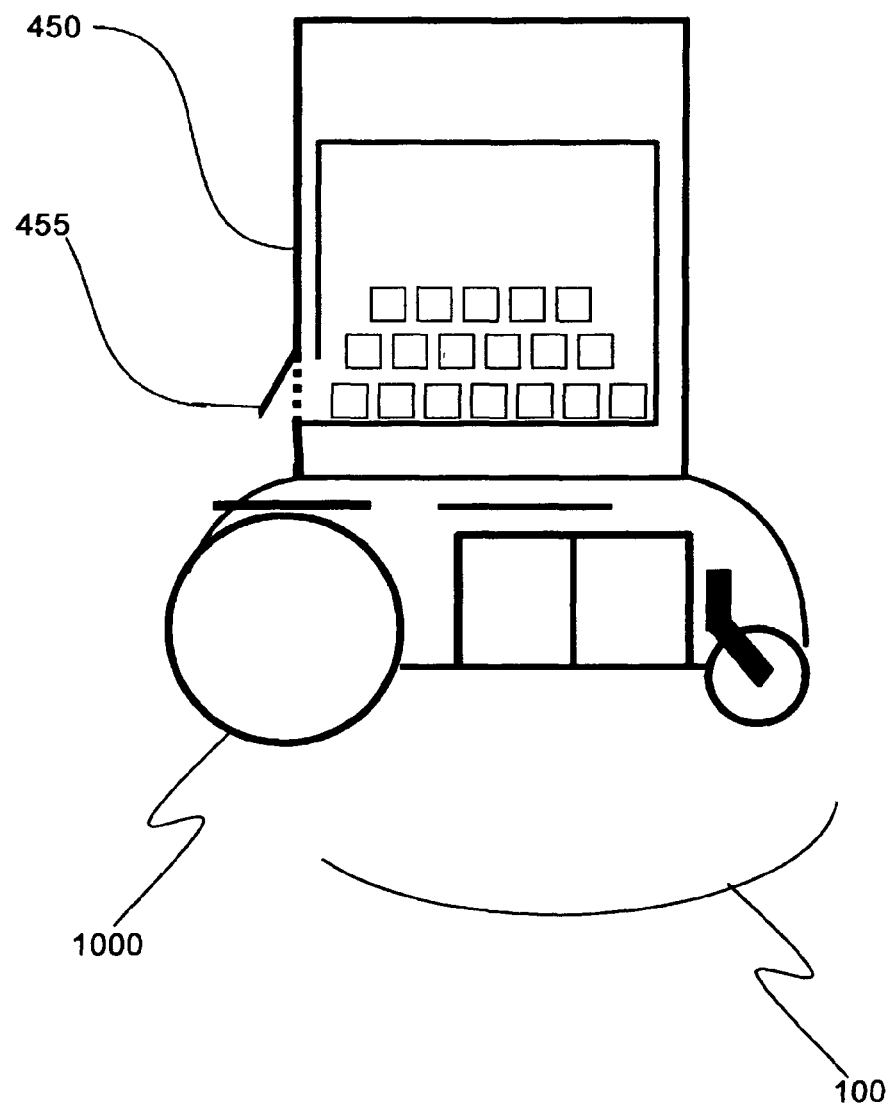
FIG. 18 illustrates an embodiment of the invention in which an attachment comprising an internal chamber to contain packages and a hatch for delivery has been attached to the platform.

FIG. 18 illustrates an embodiment in which objects may be contained in the structure 450 and may be delivered through an opening in the bottom of the structure that may comprise a hatch 455.

Figure 19:
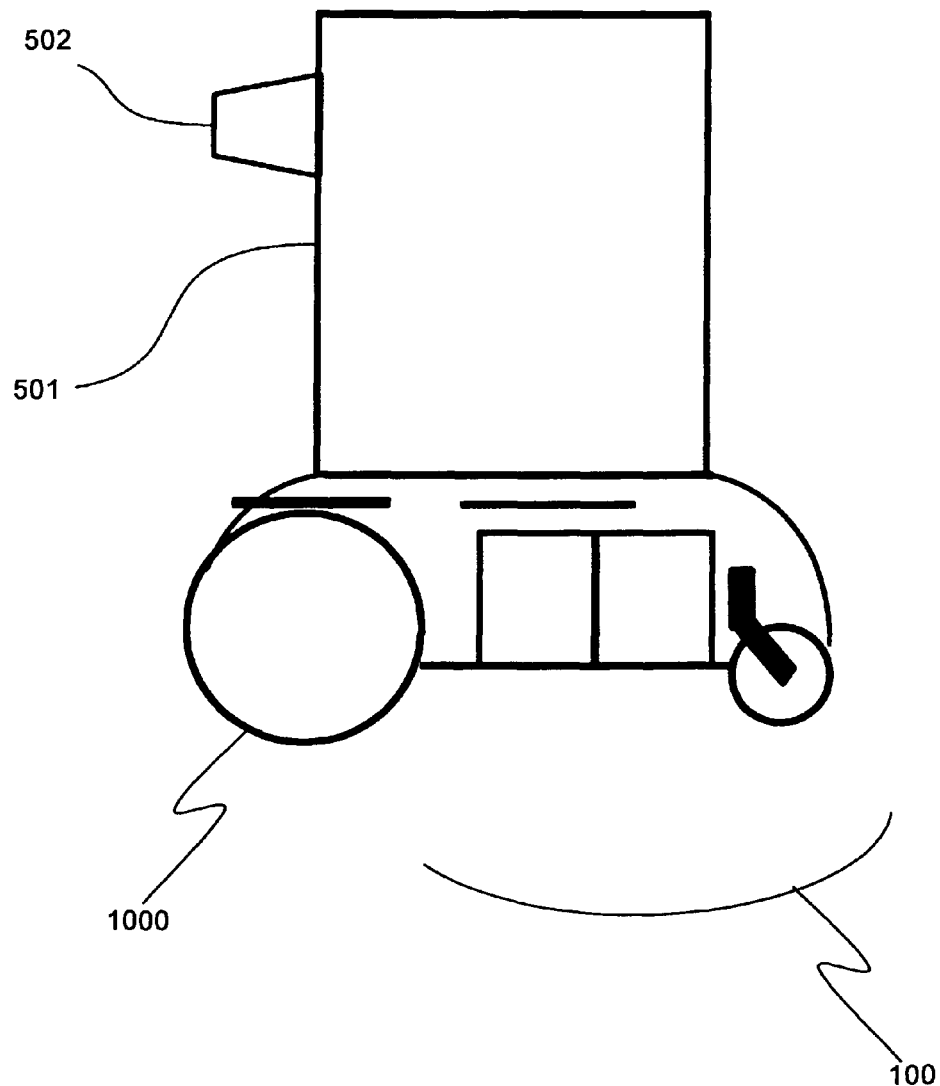
FIG. 19 illustrates an embodiment of the invention in which an attachment comprising a mechanism for delivering cups has been attached to the platform.

FIG. 19 illustrates an embodiment in which an accessory 501 is used to dispense cups 502.

Figure 20:
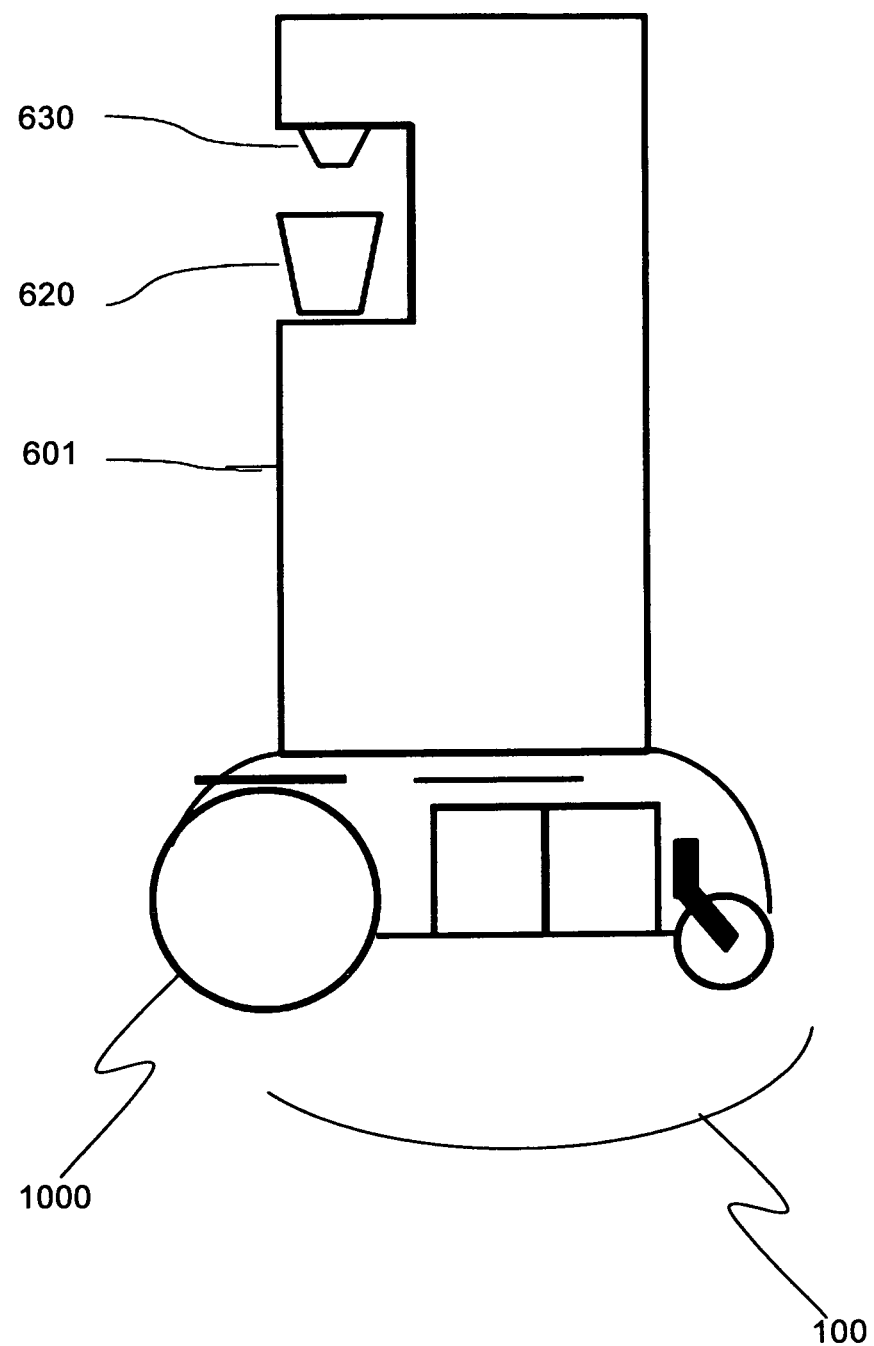
FIG. 20 illustrates an embodiment of the invention in which an attachment comprising a mechanism for delivering soft drinks has been attached to the platform.

FIG. 20 illustrates an embodiment in which an accessory 601 is used to deliver liquids, such as soft drinks, that would flow from a nozzle 630 in to a container 620. In some embodiments, this accessory is configured as a soda fountain.

Figure 21:
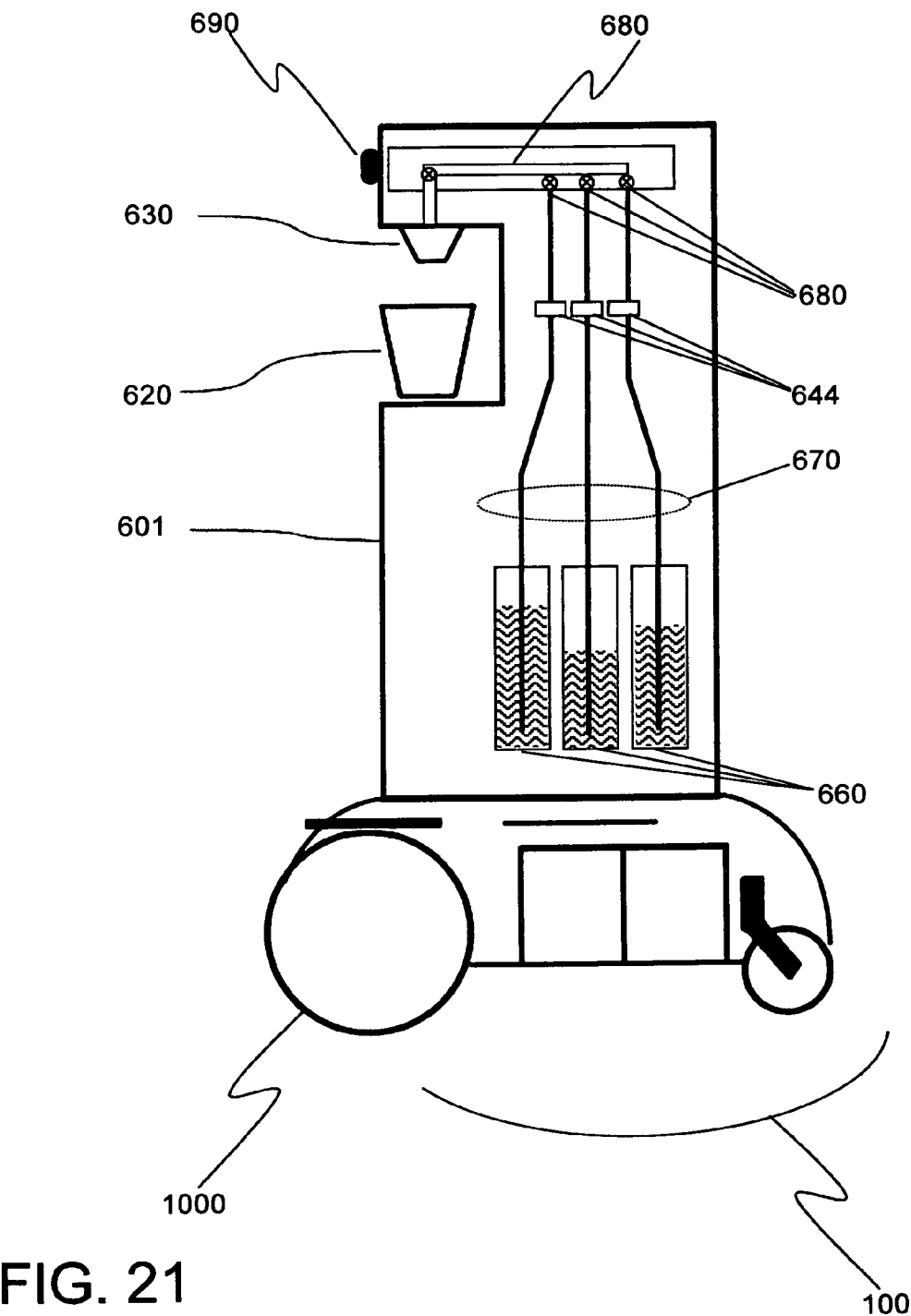
FIG. 21 illustrates an embodiment of the invention in which an attachment comprising a mechanism for delivering mixed drinks has been attached to the platform.

FIG. 21 illustrates a further improvement of the embodiment of FIG. 20, in which the accessory 601 is used to deliver mixed drinks. The ingredients for the drinks may be stored in storage, containers 660 such as tanks inside the accessory. The ingredients may include concentrated syrup for soft drinks, soda water, juices of various types, alcoholic beverages, or any other substance that a bartender may access to prepare beverages. The accessory 601 may also comprise conduits 670 such as hoses or tubes and may also comprise pumps 644 that allow the various substances in the containers 660 to be drawn up into a mixing channel 680. Various valves 680 may be used in combination with the pumps 644 to control the relative quantities of ingredients to be drawn from the storage containers 660. The proportions of the ingredients may be dictated by a panel 690 that contains electronics that allow the user to, for example, press a button selecting a particular soft drink, such as Coca-Cola®, or another beverage, such as Guinness® Stout, and the selection is converted electronically into a set of instructions that control the pumps 644 and valves 680 to dispense the appropriate measure of a beverage that, as in the previous embodiment, would flow from a nozzle 630 in to a container 620.

Figure 22:
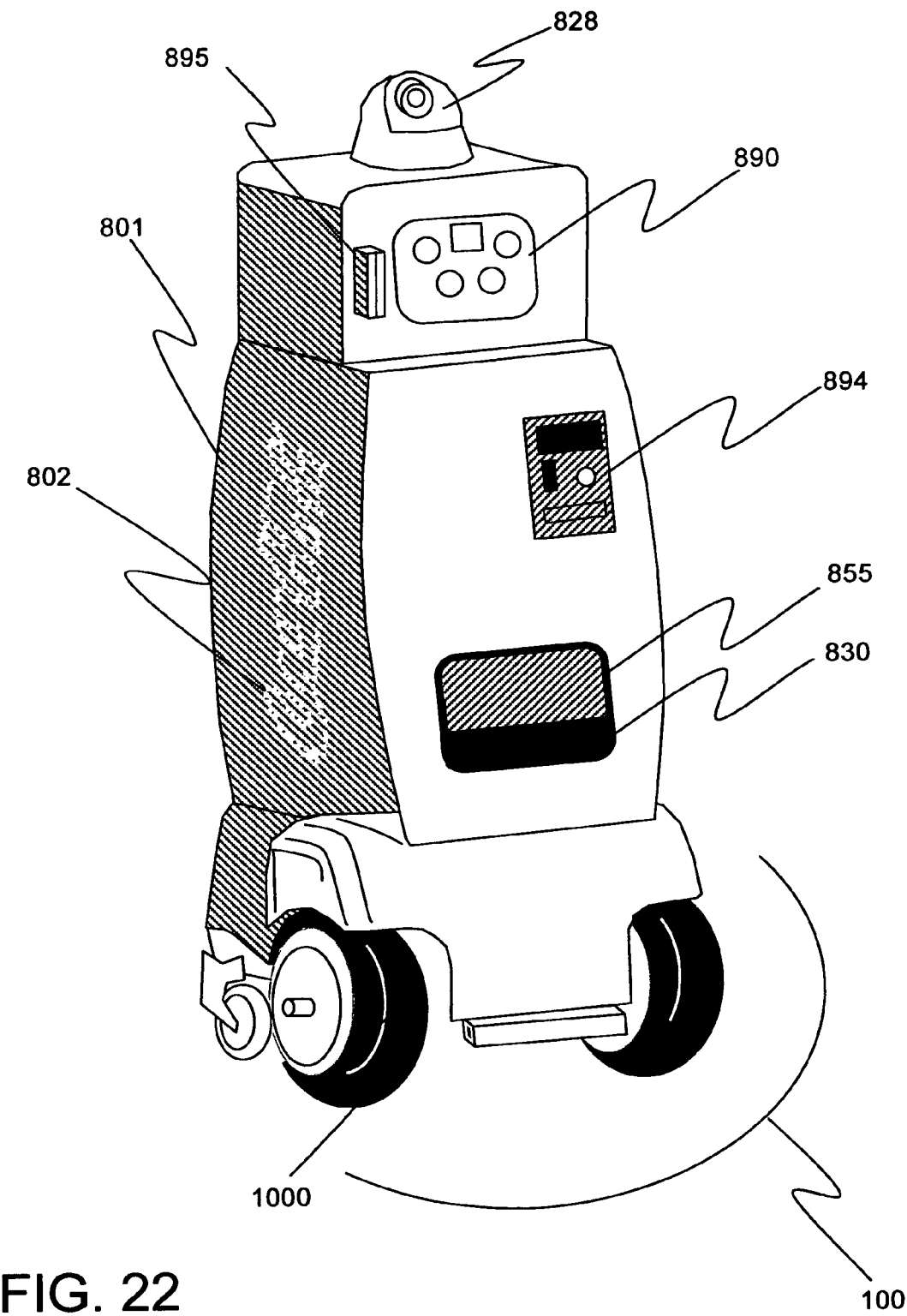
FIG. 22 illustrates an embodiment of the invention in which a structure that displays marketing messages while vending a product has been attached to the platform.

FIG. 22 illustrates an example of an embodiment employed as a vending machine that additionally comprises a means to communicate one or more marketing messages. The embodiment comprises a structure 801 that may take on the iconic imagery or shape associated with a particular brand. This structure may have visible on it markings 802 that represent the trade dress, trademark, or brand of a particular company. Additional marketing messages may be transmitted via a display 890 attached to the device. Such a display 890 may comprise a touchscreen that enables interactivity between a potential user and the system. This interactivity may be used to allow the user to purchase product from the system.

The system may accept payment by means of a conventional cash acceptance system 894 that will be known by those skilled in the art, or by means of a card payment swipe system 895 that will be known by those skilled in the art. Product can be dispensed through an opening on the system 830 that may comprise a hatch 855. The system may make use of a camera 828 which, in combination with an on-board or wirelessly connected computing capability, may identify people to navigate towards or may otherwise direct the activity of the system.

In addition to the means to transmit visually the marketing messages shown here, those skilled in the art will realize that marketing messages may also be transmitted through an audio system, video projection from the system, a video display mounted on the system, by means of fragrances released by the system, and can attempt to excite any sensory effect for which there is an association with a particular company, trademark or brand.

V. Implementation by Computer

Figure 23:
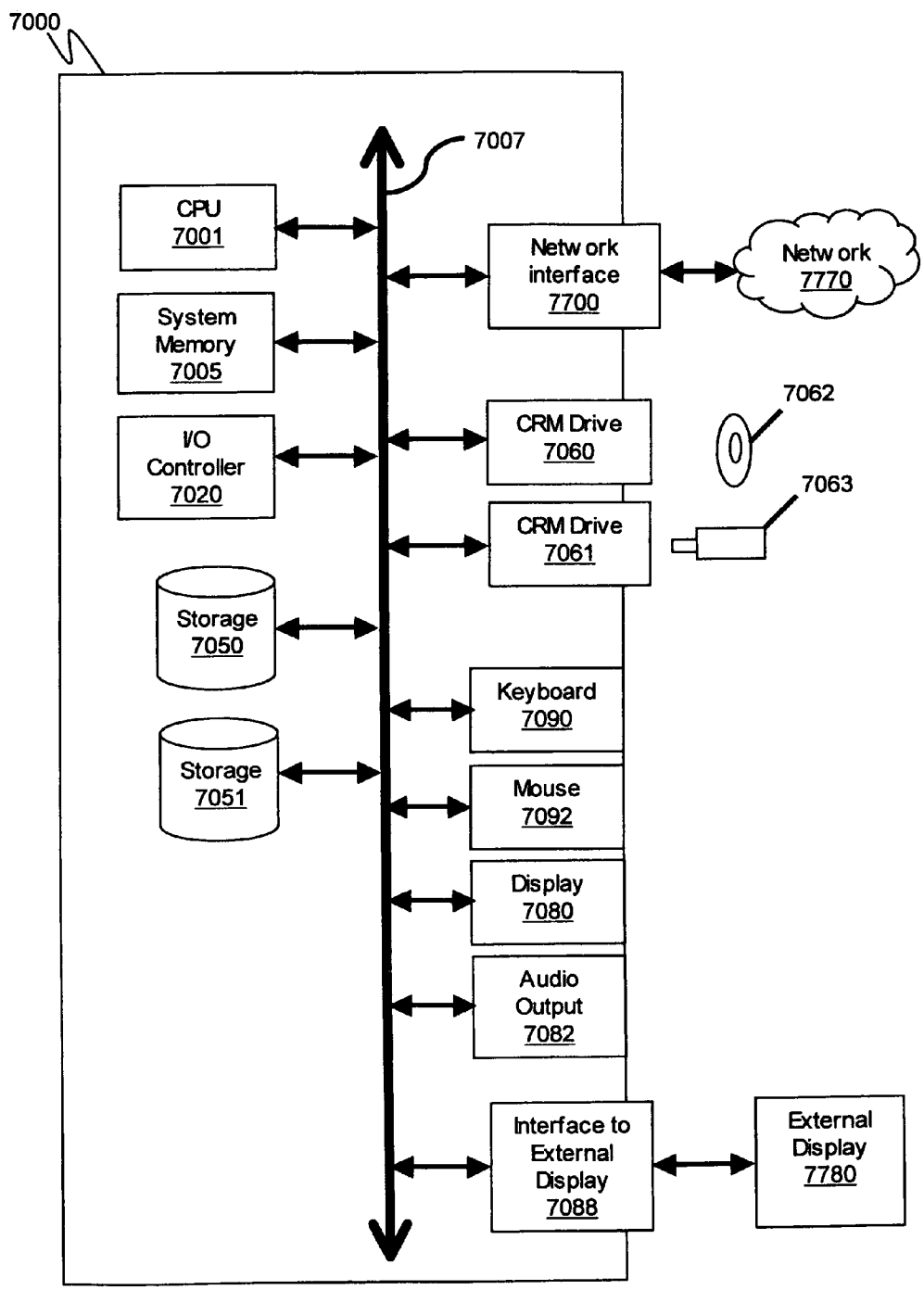
FIG. 23 illustrates a block diagram of a computer system as may be used in embodiments of the invention.

FIG. 23 illustrates a block diagram of an exemplary computer system that can serve as a platform for portions of embodiments of the present invention. Computer code in programming languages such as, but not limited to, C, C++, C#, Java®, Javascript®, Objective C®, Boo, Lua, assembly, Fortran, APL, etc., and executed in operating environments such as Windows® and all its variants, Mac OS-X®, iOS®, Android®, Blackberry®, UNIX®, Linux®, etc., can be written and compiled into a set of computer or machine readable instructions that, when executed by a suitable computer or other microprocessor based machine, can cause the system to execute the method of the invention.

Such a computer system 7000, can comprise a bus 7007 which interconnects major subsystems of computer system 7000, such as a central processing unit (CPU) 7001, a system memory 7010 (typically random-access memory (RAM), but which may also include read-only memory (ROM), flash RAM, or the like), an input/output (I/O) controller 7020, one or more data storage systems 7030, 7031 such as an internal hard disk drive or an internal flash drive or the like, a network interface 7700 to an external network 7777, such as the Internet, a fiber channel network, or the like, an equipment interface 7600 to connect the computer system 7000 to a network 607 of other electronic equipment components, and one or more drives 7060, 7061 operative to receive computer-readable media (CRM) such as an optical disk 7062, compact disc read-only memory (CD-ROM), compact discs (CDs), floppy disks, universal serial bus (USB) thumb-drives 7063, magnetic tapes and the like. The computer system 7000 may also comprise a keyboard 7090, a mouse 7092, and one or more various other I/O devices such as a trackball, an input tablet, a touchscreen device, an audio microphone and the like. The computer system 7000 may also comprise a display device 7080, such as a cathode-ray tube (CRT) screen, a flat panel display or other display device; and an audio output device 7082, such as a speaker system. The computer system 7000 may also comprise an interface 7088 to an external display 7780, which may have additional means for audio, video, or other graphical display capabilities for remote viewing or analysis of results at an additional location.

Bus 7007 allows data communication between central processor 7000 and system memory 7010, which may comprise read-only memory (ROM) or flash memory, as well as random access memory (RAM), as previously noted. The RAM is generally the main memory into which the operating system and application programs are loaded. The ROM or flash memory can contain, among other code, the basic input/output system (BIOS) that controls basic hardware operation such as the interaction with peripheral components. Applications resident with computer system 7000 are generally stored on storage units 7030, 7031 comprising computer readable media (CRM) such as a hard disk drive (e.g., fixed disk) or flash drives.

Data can be imported into the computer system 7000 or exported from the computer system 7000 via drives that accommodate the insertion of portable computer readable media, such as an optical disk 7062, a USB thumbdrive 7063, and the like. Additionally, applications and data can be in the form of electronic signals modulated in accordance with the application and data communication technology when accessed from a network 7777 via network interface 7700. The network interface 7700 may provide a direct connection to a remote server via a direct network link to the Internet via an Internet PoP (Point of Presence). The network interface 7700 may also provide such a connection using wireless techniques, including a digital cellular telephone connection, a Cellular Digital Packet Data (CDPD) connection, a digital satellite data connection or the like.

Many other devices or subsystems (not shown) may be connected in a similar manner (e.g., document scanners, digital cameras and so on). Conversely, all of the devices shown in FIG. 23 need not be present to practice the present disclosure. In some embodiments, the devices and subsystems can be interconnected in different ways from that illustrated in FIG. 23. The operation of a computer system 7000 such as that shown in FIG. 23 is readily known in the art and is not discussed in further detail in this application.

Code to implement the present disclosure can be stored on computer-readable storage media such as one or more of: the system memory 7010, internal storage units 7030 and 7031, an optical disk 7062, a USB thumbdrive 7063, one or more floppy disks, or on other storage media. The operating system provided for computer system 7000 may be any one of a number of operating systems, such as MS-DOS®, MS-WINDOWS®, UNIX®, Linux®, OS-X® or another known operating system.

Moreover, regarding the signals described herein, those skilled in the art will recognize that a signal can be directly transmitted from one block to another, between single blocks or multiple blocks, or can be modified (e.g., amplified, attenuated, delayed, latched, buffered, inverted, filtered, or otherwise modified) by one or more of the blocks. Furthermore, the computer as described above may be constructed as any one of, or combination of, computer architectures, such as a tower, a blade, a low power single board computer, an embedded computer, a development board, a desktop, a laptop, a workstation, or a mainframe (server) computer. The computer system may also be any one of a number of other portable computers or microprocessor based devices such as a mobile phone, a smart phone, a tablet computer, an iPad®, an e-reader, or wearable computers such as smart watches, intelligent eyewear and the like.

The computer system may also be one of several microprocessor-based game consoles, such as the Xbox®, Xbox 360®, and Xbox One® manufactured by Microsoft Corp. of Redmond, Wash.; the GameCube™, Wii™, Wii™, GameBoy™, DS™, 3DS™, DSi™, etc. from Nintendo Co. Ltd. of Kyoto, Japan; the Playstation®, Playstation® 2, Playstaion® 3, and Playstation® 4, PSP™, etc. manufactured by Sony Corp. of Tokyo, Japan; and the OUYA console running the Android™ operating system and manufactured by OUYA Inc. of Santa Monica, Calif.

The computer system may also be one or more of the embedded computers found in appliances, toys, robots, medical devices and systems, automobiles, aircraft, flight simulators, and other configurations that will be known to those skilled in the art.

VI. Hardware and Software

Accordingly, embodiments of the invention or portions thereof may be encoded in suitable hardware and/or in software (including firmware, resident software, microcode, etc.). Furthermore, embodiments of the present invention or portions thereof may take the form of a computer program product on a non-transitory computer readable storage medium having computer readable program code comprising instructions encoded in the medium for use by or in connection with an instruction execution system. Non-transitory computer readable media on which instructions are stored to execute the methods of the invention may therefore in turn be embodiments of the invention as well. In the context of this application, a computer readable medium may be any medium that can contain, store, communicate, propagate, or transport the program for use by or in connection with the instruction execution system, apparatus, or device.

The computer readable medium may be, for example but not limited to, an electronic, magnetic, optical, electromagnetic, infrared, or semiconductor system, apparatus, or device. More specific examples (a non-exhaustive list) of a computer readable media would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

VII. Limitations

With this application, several embodiments of the invention, including the best mode contemplated by the inventors, have been disclosed. It will be recognized that, while specific embodiments may be presented, elements discussed in detail only for some embodiments may also be applied to others.

While specific materials, designs, configurations and fabrication steps have been set forth to describe this invention and the preferred embodiments, such descriptions are not intended to be limiting. Modifications and changes may be apparent to those skilled in the art, and it is intended that this invention be limited only by the scope of the appended claims.

What is claimed is:

1. A robotic system comprising:
   a power source;
   a means to move through a designated environment having a ceiling upon which reference patterns are placed;
   an attached computing device;
   a navigation system to direct the motion of the apparatus through the designated environment; and
   a means for coupling a first additional accessory comprising a connector for providing power from the power source to the first additional accessory;
   said navigation system comprising:
   an imaging camera aimed towards the ceiling to detect reference patterns distributed throughout the designated environment, and
   an image processing system to match images of said reference patterns to a pre-stored electronic map;
   and in which
   a second additional accessory that transmits audio and video signals has been coupled to the apparatus,
   said second additional accessory further comprising
   a means to display audio and video transmissions originating from a remote location.

2. The system of claim 1, additionally comprising a structure for delivering at least one item.

3. The system of claim 2, in which the item is a container.

4. The system of claim 3, in which the container is a cup.

5. The system of claim 2, in which the item is a measured quantity of a soft drink.

6. The system of claim 2 in which the item is a measured quantity of a mixed drink.

7. The system of claim 2, further comprising a means for delivering a marketing message.

8. The system of claim 7, in which the means for delivering a marketing message is a display attached to the structure.

9. The system of claim 8, in which the means for delivering a marketing message also comprises a video display.

10. The system of claim 1, in which the means for coupling comprises at least one item selected from the group consisting of: clamps, bolts, screws, and pegs.

11. The system of claim 1, in which the means for coupling comprises at least one set of holes in a configuration that corresponds to a first accessory with a set of attachment devices.

12. The system of claim 11, in which the attachment devices are selected from the group consisting of: clamps, bolts, screws, and pegs.

13. The system of claim 1, in which the first additional accessory is a structure for carrying packages.

14. The system of claim 1, in which the first additional accessory comprises at least one robotic manipulator.

15. The system of claim 1, further comprising a means to communicate with a wireless communication network.

16. The system of claim 1, in which the power source provides the motive force for moving through the designated environment.

17. The system of claim 1, in which the power source comprises a battery selected from the group consisting of:
   a lead acid battery, a deep cycle lead acid battery, a sealed lead acid battery, an AGM lead acid battery, a gel lead acid battery, a nickel-cadmium battery, a nickel-metal-hydride battery, a lithium battery, a silicon-mediated lithium battery, a lithium ion battery, and an alkaline battery.

18. The system of claim 1, in which the power source comprises a common power conversion system selected from the group consisting of consisting of:
   a fuel cell, a hydrogen fuel cell, a hydrocarbon powered heat engine, a microwave transmission energy power source, an inductive energy source, a flywheel, a flywheel energy storage system, and a Carnot engine.

19. The system of claim 1, in which the computing device comprises at least one microprocessor.

20. The system of claim 1, in which the computing device directs the activity of the means to move through a designated environment.

21. The system of claim 1, in which the navigation system utilizes the attached computing device.

22. The system of claim 1, in which the means to move through a designated environment comprises wheels.

23. The system of claim 22, in which at least one of the wheels comprises a brushless DC hub motor.

24. The system of claim 1, in which the navigation system comprises at least one LIDAR system.

25. The system of claim 1, in which the first additional accessory comprises a means to deliver consumables.

26. The system of claim 25, in which the consumables are soft drinks.

27. A robotic apparatus comprising:
   a power source;
   a means to move through a designated environment having a ceiling upon which reference patterns are placed;
   an attached computing device;
   a navigation system to direct the motion of the apparatus through the designated environment;
   a means for coupling a first additional accessory comprising a connector for providing power from the power source to the first additional accessory; and
   additionally comprising a computer readable medium, upon which are stored instructions that direct the activities of the robot in a pre-determined sequence;
   said navigation system comprising:
   an imaging camera aimed towards the ceiling to detect reference patterns distributed throughout the designated environment, and
   an image processing system to match images of said reference patterns to a pre-stored electronic map;
   and in which
   a second additional accessory that transmits audio and video signals has been coupled to the apparatus,
   said additional accessory further comprising
   a means to display audio and video transmissions originating from a remote location.

28. The system of claim 1, additionally comprising:
a connector for communicating data between the robotic system and the first additional accessory.

29. The system of claim 27, additionally comprising:
a connector for communicating data between the robotic system and the first additional accessory.

\* \* \* \* \*